(12) United States Patent
Miyake

(10) Patent No.: US 10,082,792 B2
(45) Date of Patent: Sep. 25, 2018

(54) AUTOMATED DRIVING VEHICLE CONTROL SYSTEM

(71) Applicant: TOYOTA JIDOSHA KABUSHIKI KAISHA, Aichi-ken (JP)

(72) Inventor: Teruhiko Miyake, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 21 days.

(21) Appl. No.: 15/431,759

(22) Filed: Feb. 13, 2017

(65) Prior Publication Data

US 2017/0235310 A1    Aug. 17, 2017

(30) Foreign Application Priority Data

Feb. 17, 2016    (JP) ................. 2016-027627

(51) Int. Cl.
| | |
|---|---|
| G01C 22/00 | (2006.01) |
| G05D 1/02 | (2006.01) |
| F02D 43/04 | (2006.01) |
| F02D 41/02 | (2006.01) |
| F01N 9/00 | (2006.01) |

(52) U.S. Cl.
CPC ........... *G05D 1/0212* (2013.01); *F01N 9/002* (2013.01); *F02D 41/029* (2013.01); *F02D 41/0275* (2013.01); *F02D 41/0285* (2013.01); *F02D 43/04* (2013.01); *F02D 41/027* (2013.01); *F02D 2200/0806* (2013.01); *F02D 2200/0812* (2013.01); *F02D 2200/0818* (2013.01)

(58) Field of Classification Search
CPC ... G05D 1/0212; F01N 9/002; F02D 41/0275; F02D 41/0285; F02D 41/029; F02D 43/04; F02D 41/027; F02D 2200/0806; F02D 2200/0812; F02D 2200/0818
USPC ...................................................... 701/25, 36
See application file for complete search history.

(56) References Cited

U.S. PATENT DOCUMENTS

| | | | |
|---|---|---|---|
| 2013/0144503 A1 | 6/2013 | Nishijima et al. | |
| 2016/0259338 A1* | 9/2016 | Nakamura ............ | B60W 30/12 |

FOREIGN PATENT DOCUMENTS

| | | |
|---|---|---|
| JP | 2005214096 A | 8/2005 |
| JP | 2008180591 A | 8/2008 |
| JP | 2010059832 A | 3/2010 |
| JP | 2010-216323 A | 9/2010 |
| JP | 5327379 B2 | 10/2013 |

* cited by examiner

*Primary Examiner* — Gertrude Arthur Jeanglaud
(74) *Attorney, Agent, or Firm* — Hauptman Ham, LLP

(57) ABSTRACT

A control system includes a sensor configured to detect information associated with an area surrounding a vehicle and an electronic control unit configured to control an automated driving of the vehicle. The electronic control unit includes a driving plan generation unit, a driving control unit, a regeneration control unit configured to control a process for regenerating an engine exhaust gas treatment apparatus, and a lane selection unit configured to predict an engine load associated with traveling in each lane of a plurality of lanes. The lane selection unit is also configured to select a lane which would cause an increase in engine load when the control for regenerating the exhaust gas treatment apparatus is being performed by the regeneration control unit. The control system is configured to cause the vehicle to be driven in the lane selected by the lane selection unit.

20 Claims, 21 Drawing Sheets

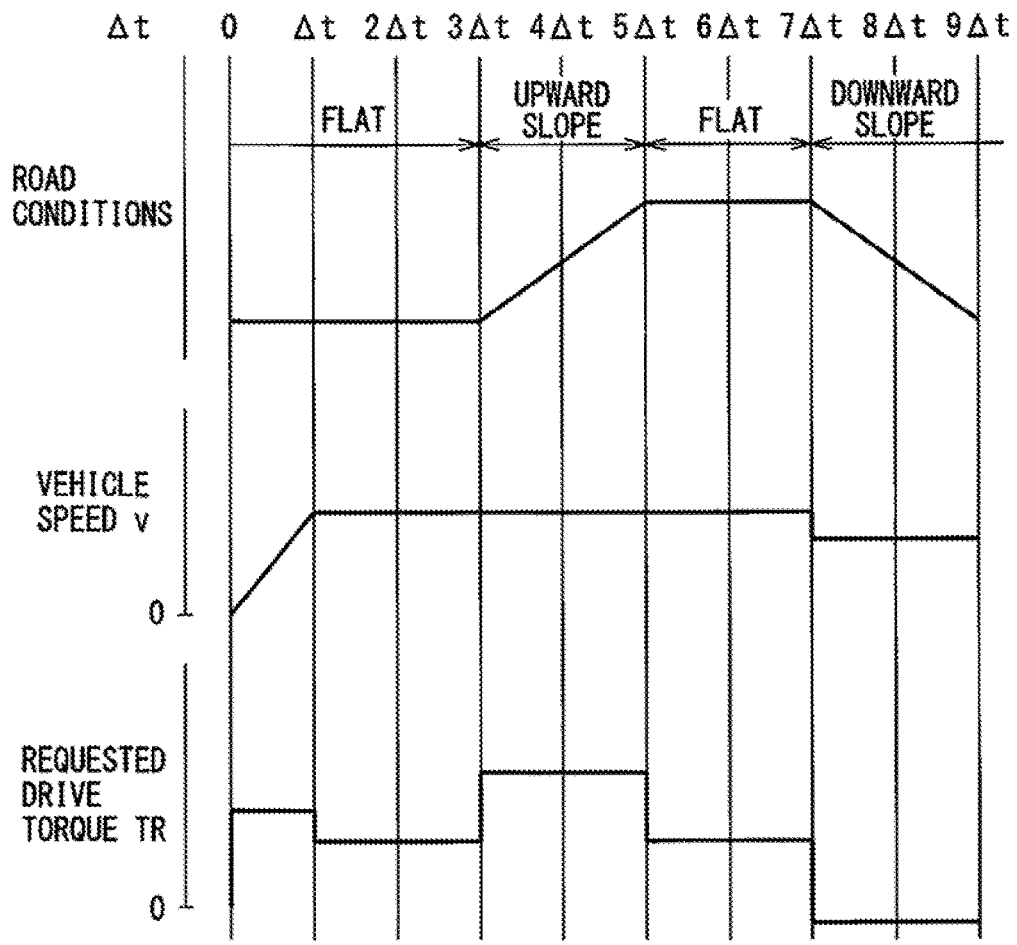
FIG. 6A
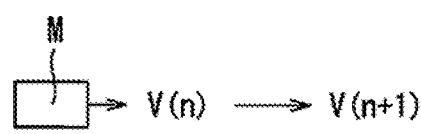
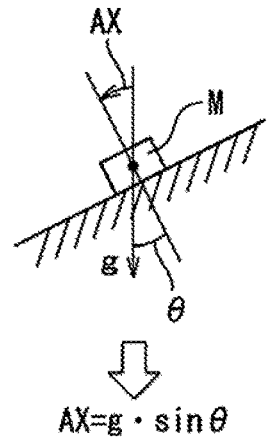
FIG. 6B
FIG. 6C

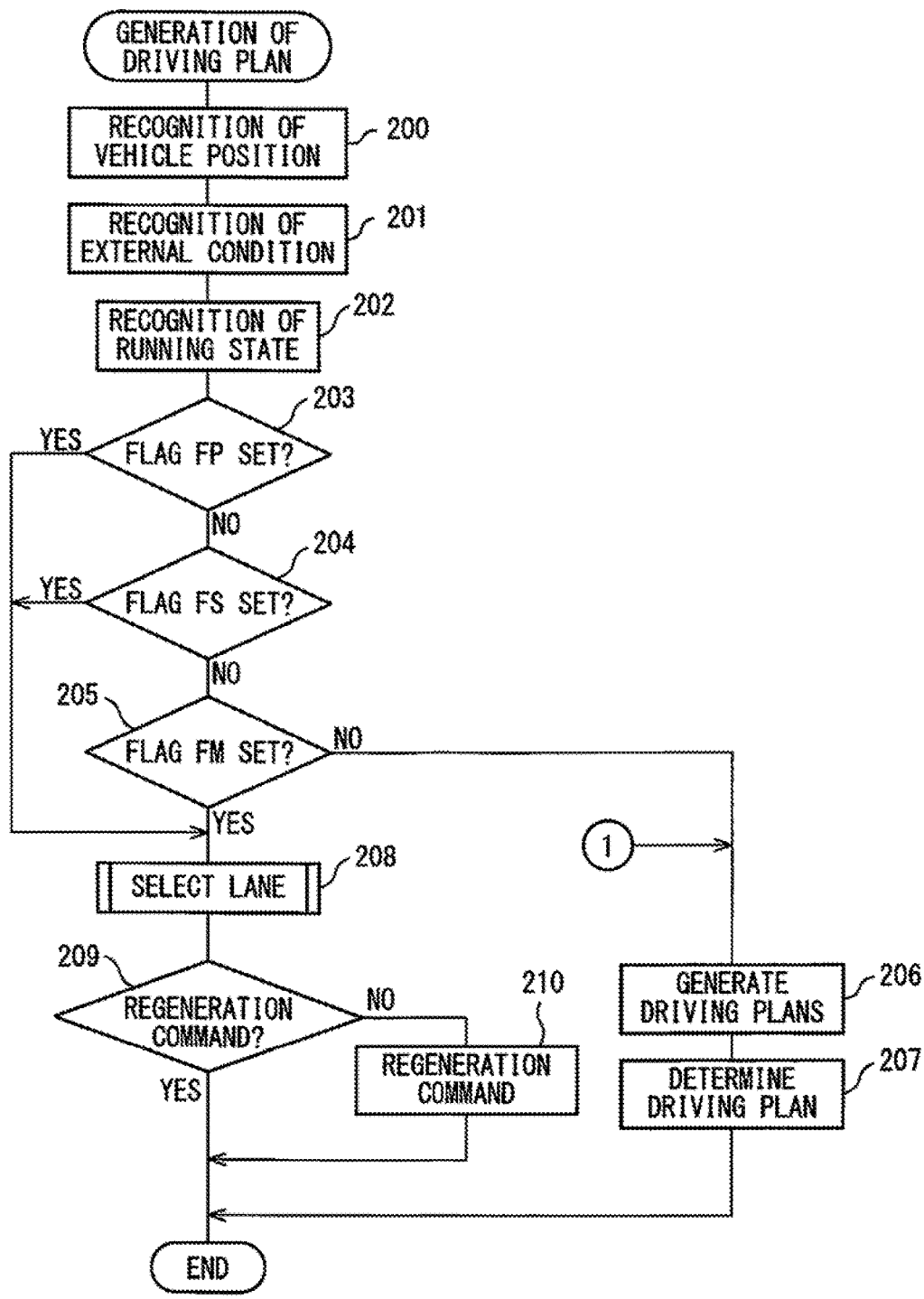

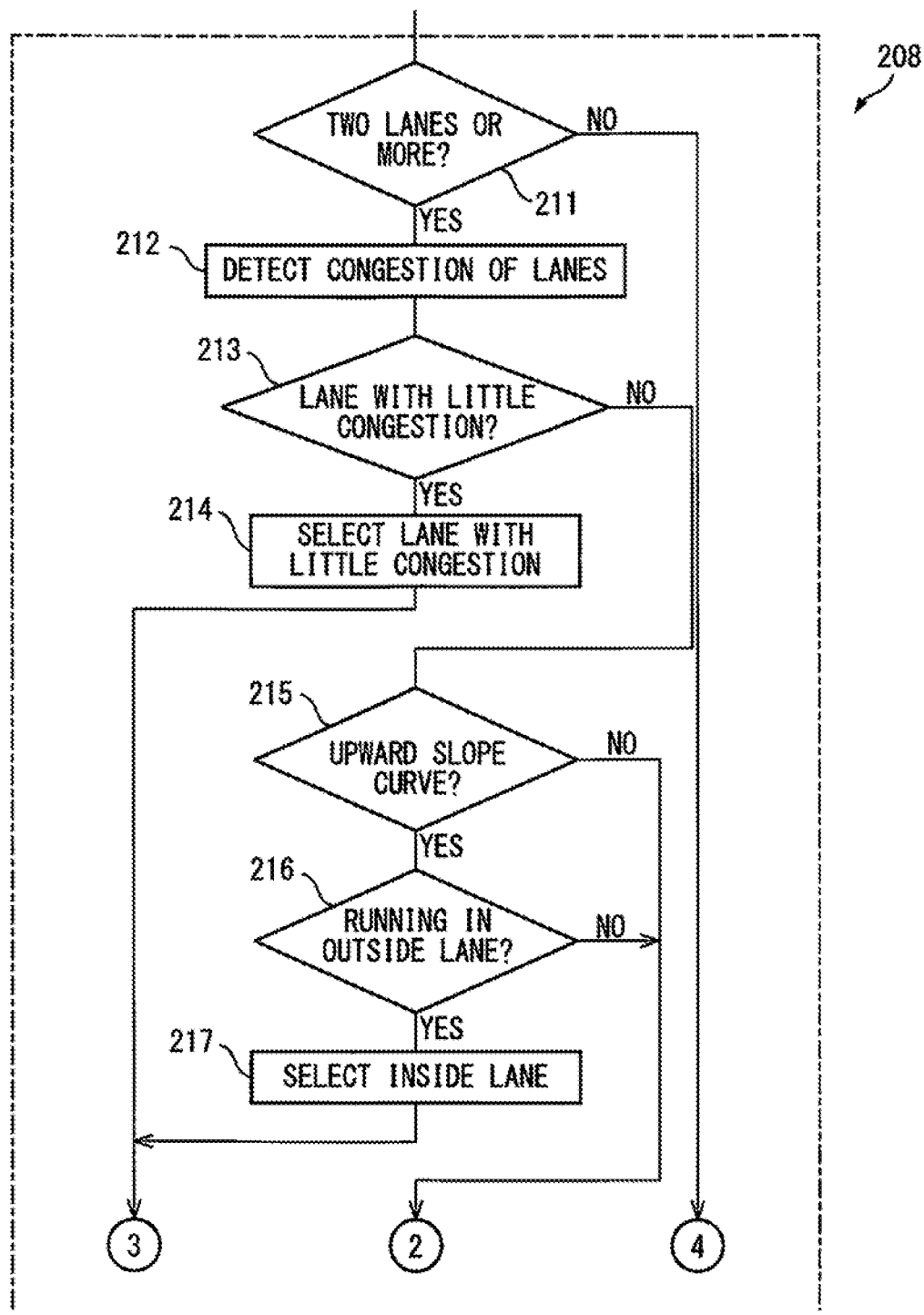

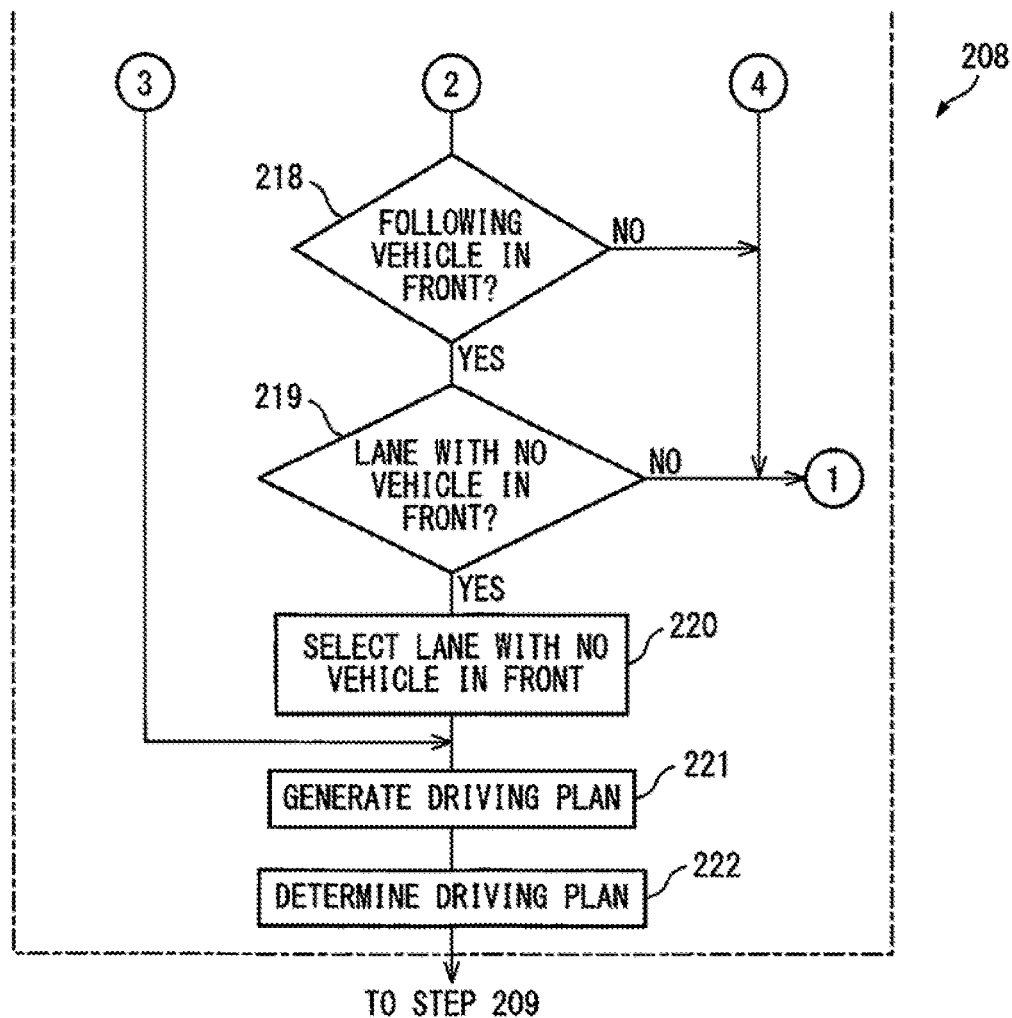

AUTOMATED DRIVING VEHICLE CONTROL SYSTEM

CROSS-REFERENCE TO RELATED APPLICATION

This application claims priority based on Japanese Patent Application No. 2016-027627 filed on Feb. 17, 2016, the entire contents of which are incorporated into the present specification by reference.

BACKGROUND

Vehicle manufacturers are challenged to improve fuel efficiency and vehicle performance. Some vehicles include an internal combustion engine that includes a particulate filter configured to trap particulate matter "PM" contained in an exhaust gas. Over time, the particulate matter builds-up on the particulate filter, and a treatment to regenerate the particulate filter is often performed. Some particulate filter regeneration treatments involve increasing the temperature of the particulate filter to burn-off the trapped particulate matter.

To raise the temperature of the particulate filter, the engine is sometimes caused to be in an operating state. Driving incidents sometimes interfere with particulate filter regeneration treatment.

BRIEF DESCRIPTION OF THE DRAWINGS

FIG. 6A is a view for explaining a change of a drive torque TR with respect to a vehicle V and a method of calculation of the drive torque TR, in accordance with some embodiments;

FIG. 6B is a view for explaining a change of a drive torque TR with respect to a vehicle V and a method of calculation of the drive torque TR, in accordance with some embodiments;

FIG. 6C is a view for explaining a change of a drive torque TR with respect to a vehicle V and a method of calculation of the drive torque TR, in accordance with some embodiments;

FIG. 23 is a flow chart for generating a driving plan, in accordance with some embodiments;

FIG. 24 is a flow chart for generating a driving plan, in accordance with some embodiments; and FIG. 25 is a flow chart for generating a driving plan, in accordance with some embodiments.

DETAILED DESCRIPTION

Some internal combustion engines include a particulate filter designed to trap particulate matter ("PM") contained in an exhaust gas. As an amount of particulate matter trapped by the particulate filter increases, some internal combustion engines, perform a treatment to burn off the particulate matter build-up. Such a treatment regenerates the particulate filter. To regenerate the particulate filter, the temperature of the particulate filter is increased to a point that the particulate matter burns. If the internal combustion engine is in a continuous operating state in which the exhaust gas temperature becomes high, the particulate matter naturally burns and the particulate filter is regenerated. However maintaining an operating state of the engine in which the exhaust gas temperature becomes and remains high enough to burn the particulate matter is difficult.

Traffic congestions sometimes interferes with maintaining an internal combustion engine in an operating state that increases the exhaust gas temperature to a level that causes the particulate matter to burn. Some internal combustion engines are configured to utilize traffic congestion information of a car navigation system, acquire information on whether a road currently being run on is congested from the car navigation system when a condition indicative that treatment for regenerating the particulate filter occurs, and, when the road currently being run on is congested, place a temporary hold on the treatment for regenerating the particulate filter. Some car navigation systems are configured to display guidance to a road able to avoid congestion and to direct a vehicle operator to drive the vehicle to the road able to avoid congestion to enable the treatment for regenerating the particulate filter to be performed while driving on the road able to avoid congestion.

Figure 1:
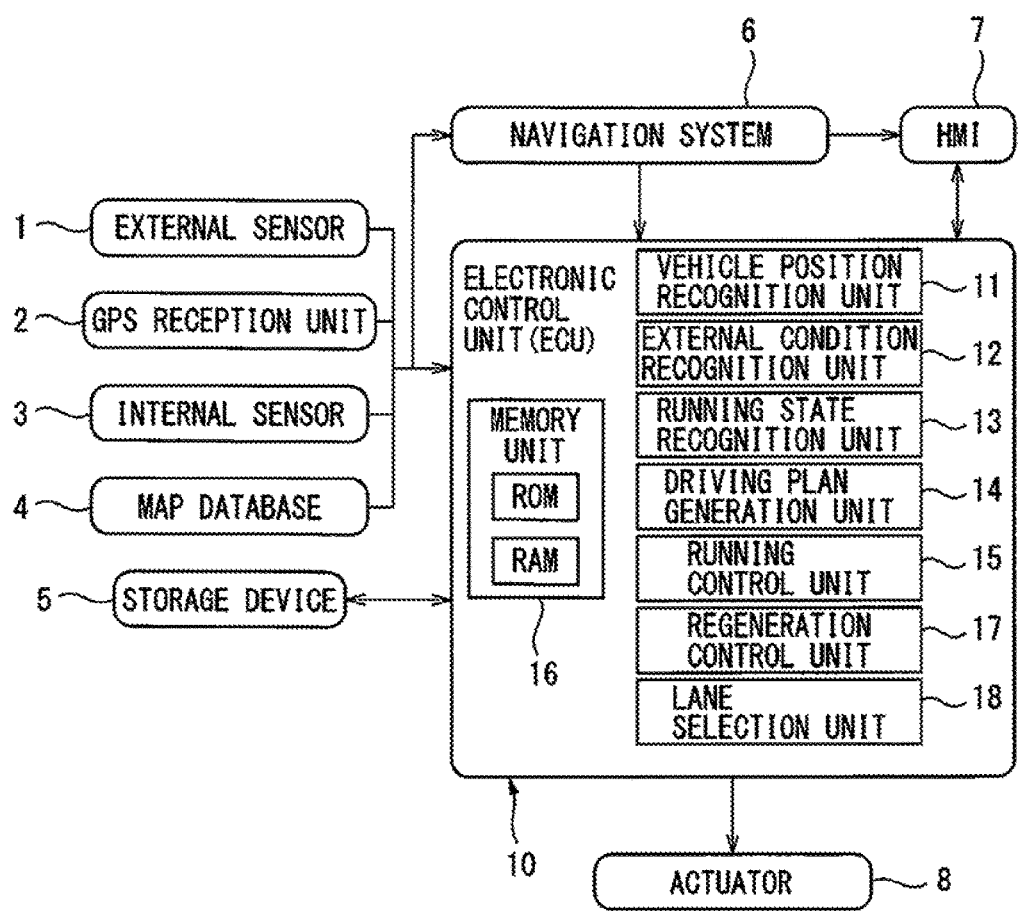
FIG. 1 is a block diagram of an automated driving system, in accordance with some embodiments.
Figure 2:
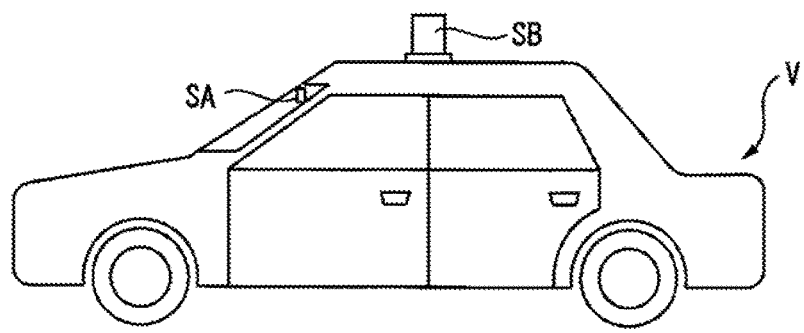
FIG. 2 is aside view of a vehicle configured to be controlled by the automated driving system, in accordance with some embodiments.

Conventional vehicles are reliant on a vehicle operator to drive the vehicle to a road able to avoid congestion such that the treatment for regenerating the particulate filter may be performed while driving on the road able to avoid congestion. Some vehicles are configured to be automatically driven, but the internal combustion engines in such vehicles are reliant on the vehicle operation to drive the vehicle to a road able to avoid congestion to perform the treatment for regenerating the particulate filter, FIG. 1 is a block diagram of an automated driving system, in accordance with some embodiments. The automated driving system is configured to control a vehicle V (FIG. 2). In some embodiments, the automated driving system is included in the vehicle V. In some embodiments, the automated driving system is communicatively coupled with the vehicle V. In some embodiments, one or more components of the automated driving system is included in the vehicle V. In some embodiments, one or more one or more components of the automated driving system are in communication with the vehicle V. In some embodiments, the automated driving system is onboard the vehicle V. In some embodiments, the automated driving system includes at least one component that is off board the vehicle V. The automated driving system is configured to minimize fuel consumption while regenerating an exhaust gas treatment apparatus of an internal combustion engine of the vehicle V. In some embodiments, the exhaust gas treatment apparatus comprises one or more of a particulate filter or other suitable device configured to treat an exhaust gas.

In some embodiments, the automated driving system is configured to minimize an amount of fuel used by an internal combustion engine to raise the temperature of the exhaust gas treatment apparatus by selecting a lane of a plurality of lanes which is predicted to cause an engine load to increase among the plurality of lanes. As a result, the automated driving system makes it possible to regenerate the exhaust gas treatment apparatus while maintaining good fuel economy.

The automated driving system comprises an external sensor 1 configured to detect information regarding the surroundings of a host vehicle V, a GPS (global positioning system) reception unit 2, an internal sensor 3, a map database 4, a storage device 5, a navigation system 6, an HMI (human machine interface) 7, various actuators 8, and an electronic control unit (ECU) 10. Note that in this specification, the vehicle which is controlled by the discussed automated driving system will be hereinafter referred to as "the host vehicle V" or simply "vehicle V".

In some embodiments, the external sensor 1 is configured to detect external conditions regarding the surroundings of the host vehicle V. The external sensor 1 comprises at least one of a camera, radar, LIDAR (laser imaging detection and ranging device), or some other suitable sensor. In some embodiments, the external sensor 1 is a camera configured to capture one or more images of an area outside the vehicle V. In some embodiments, the external sensor 1 is a camera SA (FIG. 2) configured to be positioned at a back side of a front windshield of the vehicle V. Camera SA is configured to capture an image of the front of the vehicle V. The information captured by camera SA is sent to the electronic control unit 10.

In some embodiments, the external sensor 1 comprises a radar unit configured to utilize radio waves to detect obstacles at the outside of the vehicle V. The radar unit detects obstacles around the vehicle V based on reflected waves of radio waves emitted by the radar unit to the surroundings of the vehicle V. Obstacle information detected by the radar is sent to the electronic control unit 10.

In some embodiments, external sensor 1 comprises a LIDAR unit configured to utilize laser beams to detect the road on which the host vehicle V is running and obstacles outside the vehicle. In some embodiments, the external sensor 1 is a LIDAR unit SB (FIG. 2) installed on the roof of the vehicle V. LIDAR unit SB is configured to measure the distance to the road and obstacles around the road based on reflected light of laser beams which are successively fired toward the overall surroundings of the vehicle V by the LIDAR unit SB. In some embodiments, the LIDAR unit is configured to detect the road and the presence of obstacles in the overall surroundings of the vehicle V in the form of a three-dimensional image. The three-dimensional image of the road and obstacles which are detected by LIDAR unit SB are sent to the electronic control unit 10.

The GPS reception unit 2 is configured to receive signals from three or more GPS satellites and determine the position of the host vehicle V for example the latitude and longitude of the vehicle V) based on the received signals. The position information of the vehicle V determined by the GPS reception unit 2 is sent to the electronic control unit 10.

In some embodiments, the internal sensor 3 is configured to detect a running state of the host vehicle V. The internal sensor 3 comprises at least one of a vehicle speed sensor, an acceleration sensor, a yaw rate sensor, or some other suitable sensor. In some embodiments, the internal sensor 3 comprises a vehicle speed sensor configured to detect a speed of the vehicle V. In some embodiments, the internal sensor 3 comprises an acceleration sensor configured to detect an acceleration in a front-rear direction of the vehicle V. In some embodiments, the internal sensor 3 comprises a yaw rate sensor configured to detect a rotational angular speed about a vertical axis of the center of gravity of the vehicle V. The information which is detected by the vehicle speed sensor, the acceleration sensor, and/or the yaw rate sensor is sent to the electronic control unit 10.

In some embodiments, map database 4 comprises a database relating to map information. In some embodiments, map database 4 is stored in a computer-readable medium included as a component of vehicle V, mounted to or within vehicle V, or remote from vehicle V. In some embodiments, map database 4 is stored in an HDD (hard disk drive) which is mounted in the vehicle. The map information comprises one or more of position information of the road, information of the road shape (for example, type such as curved or straight, curvature of curve, etc.), position information of intersections and forks, or other suitable descriptions associated with a road and/or position.

In some embodiments, the storage device 5 is configured to store three-dimensional images of obstacles on and around the road, which were detected by the external sensor 1. In some embodiments, the three-dimensional images of the obstacles are constantly or periodically updated. In some embodiments, the storage device 5 is configured to store the three-dimensional images of obstacles when the vehicle V is being driven at least partially within a preselected driving lane. In some embodiments, the storage device 5 is configured to store the three-dimensional images of obstacles when the vehicle V is being driven at the exact center of a preselected driving lane.

In some embodiments, the navigation system 6 is configured to guide the driver of the vehicle V to a destination. In some embodiments, the destination is set by the driver or some other user input. In some embodiments, the destination, is set by the navigation system 6 based on a received signal. Navigation system 6 is configured to calculate a target route to the destination based on the current position information of the host vehicle V which is measured by the GPS reception unit 2 and the map information of the map database 4. This information of the target route of the vehicle V is sent to the electronic control unit 10.

In some embodiments, HMI 7 comprises an interface tor output and input of information between the driver of the vehicle V and the automated driving system. In some embodiments, HMI 7 comprises one or more of a display panel for displaying image information to the driver, a speaker for voice output, one or more operation buttons, a touch panel, or some other suitable device configured to make it possible for a user to interact with at least one of the components of the automated driving system or the vehicle V. In some embodiments, HMI 7 is configured to receive an instruction from the driver or a passenger of the vehicle V. In some embodiments, HMI 7 is configured to send a signal to the electronic control unit 10 based on a driver input instruction to start the automated driving, resulting in the vehicle being in an automated driving mode, wherein the vehicle is driven without operations of the driver. HMI 7 is configured to send a signal to the electronic control unit 10 to stop the automated driving of the vehicle V based on an instruction input by the driver, resulting in the automated driving mode being switched to the manual driving mode wherein the vehicle V is driven by operations of the driver.

In some embodiments, actuator X is configured to control the running of the vehicle V. In some embodiments, actuator 8 comprises one or more of an accelerator actuator, a brake actuator, a steering wheel actuator, or some other suitable actuated associated with controlling the vehicle V. The accelerator actuator is configured to control a throttle opening degree in accordance with a control signal from the electronic control unit 10 and thereby controls a drive force of the vehicle V. The brake actuator is configured to control the amount of depression of a brake pedal in accordance with a control signal from the electronic control unit 10 and thereby controls a braking force given to the wheels of the vehicle V. The steering wheel actuator is configured to control the drive of a steering assist motor of an electric power steering system in accordance with a control signal from the electronic control unit 10 and thereby controls a steering action of the vehicle V.

The electronic control unit 10 comprises one or more of a CPU (central processing unit), ROM (read only memory), RAM (random access memory), or other suitable components, connected to each other by a bidirectional box. Note that, FIG. 1 shows the case of using a single electronic control unit 10, but a plurality of electronic control units can also be used. The electronic control unit 10 comprises a vehicle position recognition unit 11, external condition recognition unit 12, running state recognition unit 13, driving plan generation unit 14, running control unit 15, memory unit 16, regeneration control unit 17, and driving lane selecting unit 18. In some embodiments, the memory unit 16 comprises the ROM and RAM.

In some embodiments, the storage device 5 stores the three-dimensional images of outside stationary obstacles which are detected by the external sensor 1 when the vehicle V is being driven to account for potential inaccuracies in the position of the vehicle V determined by the GPS. For example, if using GPS, it is possible to recognize the absolute position of the vehicle V (latitude and longitude). Therefore, the absolute position of the host vehicle Y on the map of the map database 4 when automated driving is started is recognized at the vehicle position recognition unit 11 based on the position information of the host vehicle V which is received by the GPS reception unit 2. However, the position of the host vehicle V on the road in the map database 4 which is obtained using GPS is sometimes different from the actual position of the host vehicle V on the road. The potential variability between the GPS-based position of the vehicle and the actual position of the vehicle on the road makes it difficult to use the position of the host vehicle V which is obtained using GPS as the basis for automated driving. To account for this variability, the vehicle position recognition unit 11 is configured to determine the actual position of the host vehicle V on the road by using the three-dimensional images which are stored in the storage device 5. In some embodiments, the vehicle position recognition unit is configured to determine the actual position of the host vehicle V on the road based on the three-dimensional images stored in the storage device 5 and a determination that the vehicle V is at the exact center of a preselected driving lane.

In some embodiments, when the absolute position of the host vehicle V is recognized based on position information of the host vehicle V which is received at the GPS reception unit 2, the current accurate position of the host vehicle V on the road is recognized by comparing the three-dimensional images of outside stationary obstacles, stored in the storage device 5, at the absolute position of the host vehicle V and the current three-dimensional images of outside stationary obstacles detected by the external sensor 1 at the external condition recognition unit 12. In some embodiments, the external condition recognition unit 12 is configured to shift the three-dimensional images of outside stationary obstacles detected using the external sensor a little at a time to find an image position in which these three-dimensional images are superposed over the three-dimensional images of the outside stationary obstacles which are stored in the storage device 5. The amount of shift of the three-dimensional images at this time expresses the amount of deviation of the host vehicle V from the exact center of the driving lane on the road. In some embodiments, the vehicle position recognition unit 11 is configured to calculate the current accurate position of the host vehicle V based on the determined amount of deviation of the host vehicle V from the exact center of the driving lane on the road. In some embodiments, the external condition recognition unit 12 is configured to calculate the current accurate position of the host vehicle V based on the determined amount of deviation of the host vehicle V from the exact center of the driving lane on the road If the amount of deviation of the host vehicle V from the exact center of the driving lane is found in this way, when the automated driving of the vehicle V is started, the vehicle V is controlled to be driven so that the vehicle V runs at the exact center of the driving lane. The process of finding the image position where the three-dimensional images of outside stationary obstacles which are detected by the external sensor 1 are superposed on the three-dimensional images of outside stationary obstacles which are stored in the storage device 5 is continuously performed during the time at which the vehicle V is driven, and the host vehicle V is controlled so that tire vehicle V runs at the exact center of the driving lane of the target route which is set by the driver. In addition, in the external condition recognition unit 12, by comparing the three-dimensional images of outside obstacles which are detected by the external sensor 1 (stationary obstacles and moving obstacles) and the three-dimensional images of outside stationary obstacles which are stored in the storage device 5, the presence of moving obstacles such as pedestrians is recognized.

In some embodiments, the vehicle position recognition unit 11 is configured to recognize the absolute position of the host vehicle V is recognized based on the position information of the host vehicle V which is received at the GPS reception unit 2, and if the external conditions of the host vehicle V are recognized at the external condition recognition unit 12, the accurate position of the host vehicle V on the road is recognized based on this external conditions and the absolute position of the host vehicle V. In this case, at the external condition recognition unit 12, the external conditions of the host vehicle V are recognized based on the results of detection by the external sensor 1 (for example, the captured information of the camera SA, the obstacle information from the radar, the three-dimensional images of the obstacles which are detected by the LIDAR SB, etc.). In some embodiments, external conditions include the positions of white lines of a driving lane with respect to the host vehicle V, the position of the center of the lane with respect to the vehicle V, the width of the road, the shape of the road (for example, the curvature of the driving lane, the change in grade of the road surface, etc.), and the situation of obstacles around the vehicle V (for example, information differentiating stationary obstacles and moving obstacles, positions of obstacles with respect to the vehicle V, the direction of movement of obstacles with respect to the vehicle V, the relative speed of obstacles with respect to the vehicle V, etc.).

In some embodiments, the running state recognition unit 13 is configured to determine the running state of the vehicle V based on the information detected by the internal sensor 3 (for example, the vehicle speed information from the vehicle speed sensor, the acceleration information from the acceleration sensor, the rotational angular speed information of the yaw rate sensor, etc.). In some embodiments, the running state of the vehicle V includes, for example, one or more of the vehicle speed, acceleration, or rotational angular speed about the vertical axis of the center of gravity of the vehicle V.

In some embodiments the driving plan generation unit 34 is configured to prepare a driving plan of the host vehicle V along the target route which is set by the driver based on the accurate position of the vehicle recognized by the external condition recognition unit 12, the external conditions of the vehicle which are recognized by the external condition recognition unit 12 (position, advancing direction, etc. of other vehicle), and the speed and acceleration of the host vehicle V, etc. detected by the internal sensor 3. In some embodiments, the preparing the driving plan comprises determining a running path of the host vehicle V to reach the destination safety and in the shortest time while observing the law.

In some embodiments, the regeneration control unit 17 is configured to control a regeneration process for regenerating the exhaust gas treatment apparatus of the internal combustion engine of the vehicle V to remove particulate matter such as, but not limited to, exhaust particulates or sulfur oxides which are accumulated on the exhaust gas treatment apparatus. In some embodiments, the driving lane selecting unit 18 is configured to one or more of predict or select a driving lane out of a plurality of driving lanes that would cause an engine load to increase based on the map information and information on the surroundings of the vehicle detected by the external sensor 1 when the regeneration control of the exhaust gas treatment device is performed by the regeneration control unit 17.

Figure 3:
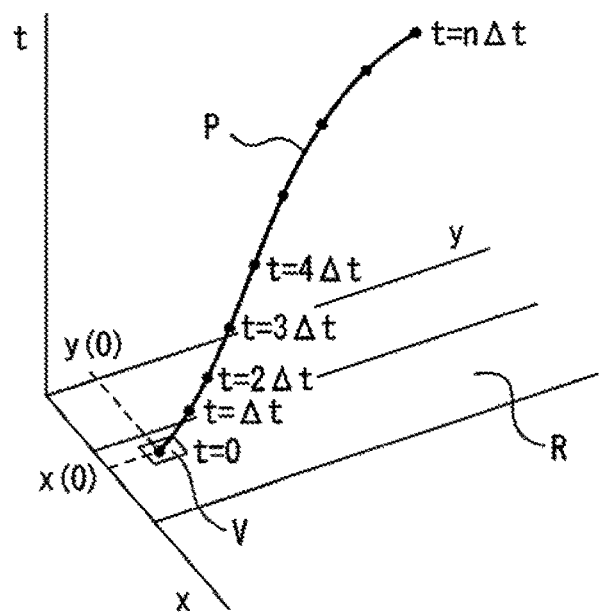
FIG. 3 is a view for explaining a trajectory of a vehicle running path, in accordance with some embodiments.
Figure 4:
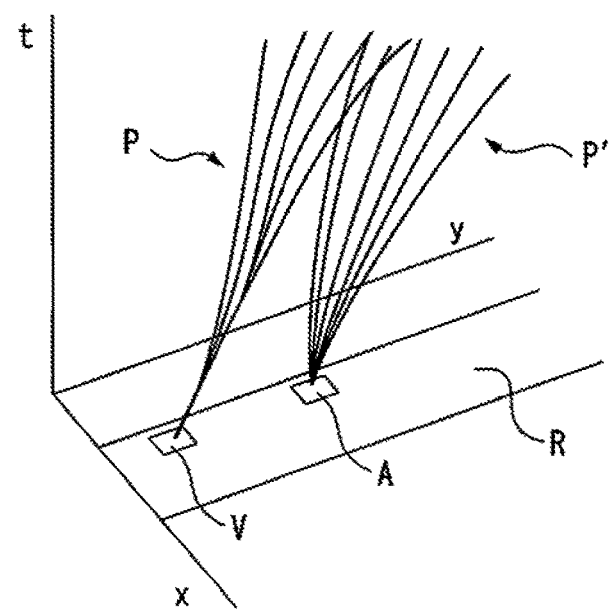
FIG. 4 is a view for explaining a trajectory of a vehicle running path, in accordance with some embodiments.

A method of determining a running path of the host vehicle V at the driving plan generation unit 14, in accordance with some embodiments, will be explained in brief with reference to FIG. 3 and FIG. 4. FIG. 3 and FIG. 4 show a three-dimensional space where an axis perpendicular to the xy plane is made the time axis "t". The xy plane of FIG. 3 represents the ground surface in the road map which is stored in the storage device 5, and in FIG. 3, R indicates a road on the map which is stored at the storage device 5. Further, in FIG. 3, V indicates a host vehicle which is driving on the road R, and the y-axis direction on the xy plane is made the advancing direction of the host vehicle V. Note that, the positions of the road R and the host vehicle V in FIG. 3 perfectly match, the actual positions of the road R and the host vehicle V on a one-to-one basis.

In the driving plan generation unit 14, as shown in FIG. 3 by P, a trajectory of a future running path of the host vehicle V in the three-dimensional space comprised of the xyz axes is generated. The initial position of this trajectory is the current position of the host vehicle V. The time t at this time is made zero (time t=0), while the position of the host vehicle V at this time is made the position (x(0), y(0)) on the road R of the load map which is stored in the storage device 5. Further, the running state of the host vehicle V is expressed by the vehicle speed v and advancing direction θ, while the running state of the host vehicle V at the time t=0 is made (v(0), θ(0)) on the road R of the road map which is stored in the storage device 5. In this way, the position of the host vehicle V and the running state of the host vehicle V are made to change along with the advance of the vehicle on the road map which is stored in the storage device 5.

Now then, the driving operations which are performed by the host vehicle V from the time t=0 until the Δt time (0.1 to 0.5 second) elapses are selected from among a preset plurality of operations. Giving a specific example, the acceleration of the vehicle is selected from a plurality of values which are preset in −10 to +30 km/h/sec in range, while the steering angular speed is selected from among a plurality of values which are preset in −7 to +7 degrees/sec in range. In this case, giving one example, for all combinations of a plurality of values of acceleration and a plurality of values of steering angular speed of the vehicle, the position (x(1), y(1)) of the host, vehicle V and the running state (v(1), θ(1)) of the host vehicle V after the Δt time (t=Δt) are found, next the position (x(2), y(2)) of the host vehicle V and the running state (v(2), θ(2)) of the host vehicle V after a further Δt time, that is, after 2Δt time (t=2Δt), are found. Similarly, the position (x(n), y(n) of the host vehicle V and the running state V (v(n), θ(n) of the host vehicle V after the nΔt time (t=nΔt) are found.

In the driving plan generation unit 14, a plurality of the trajectories of the vehicle running paths are generated by connecting the positions (x, y) of the vehicle A which are found for the combinations of the plurality of values of acceleration and the plurality of values of steering angular speed of the vehicle V. In FIG. 3, "P" shows one representative trajectory among the thus obtained trajectories. If a plurality of the trajectories of the vehicle running paths are generated, for example a trajectory which is able to reach the destination safely and in the shortest time while observing the law is selected from among these trajectories, and this selected trajectory is determined as the advancing course of the host vehicle V. Note that, in FIG. 3, the projection on the xy plane on the road R of this trajectory becomes the vehicle running path of the host vehicle V on the road R of the road map which is stored in the storage device 5. The running path of the vehicle V on the road map which is stored in the storage device 5 becomes the actual running path of the vehicle V on the actual road.

Next, referring to FIG. 4, one example of the method of selecting a trajectory which is able to reach the destination safely and in the shortest time while observing the law from among these trajectories will be briefly explained. The xy plane of this FIG. 4, in the same way as in FIG. 3, also represents the ground surface on the road map which is stored in the storage device 5. Further, in FIG. 4, V, in the same way as in FIG. 3, shows the host vehicle, while A shows another vehicle in front of the host vehicle V which is advancing in the same direction as the vehicle V. Note that, in FIG. 4, the plurality of the trajectories P of the vehicle running paths which are generated for the host vehicle V are shown. Now then, in the driving plan generation unit 14, a plurality of the trajectories of the vehicle running paths for combinations of the plurality of values of acceleration of the vehicle and the plurality of values of steering angular speeds for the other vehicle A are generated as well. The plurality of the trajectories of the vehicle running paths which are generated for the other vehicle A are shown in FIG. 4 by P'.

In the driving plan generation unit 14, first, it is judged for all trajectories P, based on external information which is recognized by the external condition recognition unit 12, whether the host vehicle V can be driven on the road R and whether the host vehicle V will contact any fixed obstacle or pedestrian when the vehicle V is advancing according to a trajectory P. If it is judged that the vehicle V cannot be driven on the road R or if it is judged that the vehicle V will contact a fixed obstacle or pedestrian when the host vehicle V is advancing according to the trajectory P, that trajectory is excluded from the options and it is judged for the remaining trajectories P whether or not the host vehicle V interferes with the other vehicle A.

That is, in FIG. 4, when a trajectory P and a trajectory P' intersect, it means that at the intersecting time "t", the host vehicle V and the other vehicle A will collide. Therefore, if there is a trajectory P which intersects with a trajectory P' among the above-mentioned remaining trajectories P, the trajectory P which intersects with the trajectory P' is excluded from the options, and the trajectory P which enables the destination to be reached in the shortest time is selected from among the remaining trajectories P. In this way, the trajectory P which enables the destination to be reached safely and in the shortest time while observing the law is selected to the plurality of trajectories of the vehicle running path.

If the trajectory P is selected, the position (x(1), y(1)) of the vehicle V and the driving state (v(1), θ(1)) of the vehicle V at the time t=Δt on the selected trajectory P, the position (x(2), y(2)) of the vehicle V and the driving state (v(2), θ(2)) of the vehicle V at the time t=2Δt on the selected trajectory P, . . . and the position (x(n), y(n)) of the vehicle V and the driving state (v(n), θ(n)) of the vehicle V at the time t=nΔt on the selected trajectory P are output from the driving plan generation unit 14, and in the driving control unit 15, the driving operation of the vehicle is controlled based on these positions of the vehicle V and driving states of the vehicle V.

Next, at the time t=Δt, the time "t" at this time is made zero (time t=0), the position of the vehicle V is made (x(0), y(0)), the driving state of the vehicle V is made (v(0), θ(0)), a plurality of the trajectories P of the vehicle running path are generated again for the combinations of the plurality of values of acceleration of the vehicle and plurality of values of steering angular velocity, and the optimum trajectory P is selected from these trajectories P. If the optimum trajectory P is selected, the positions of the vehicle V and the driving states of the vehicle V at the times t=Δt, 2Δt, . . . nΔt on the selected trajectory P are output from the driving plan generation unit 14, and in the driving control unit 15, the driving operation of the vehicle is controlled based on these positions of the vehicle V and driving states of the vehicle V. After this operation is completed, the operation is repeated.

Figure 5:
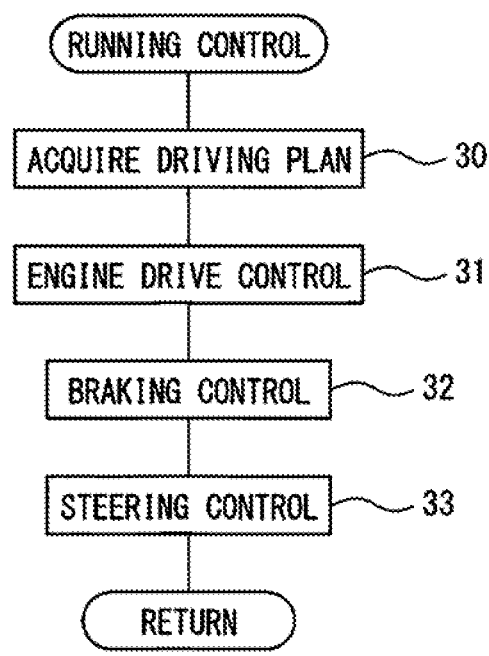
FIG. 5 is a flow chart for running control, in accordance with some embodiments.

Next, the driving control which is performed based on the driving plan generated by the driving plan generation unit 14 will be briefly explained. Referring to FIG. 5 which shows the routine for performing this driving control of the vehicle, first, at step 30, the driving plan which is generated by the driving plan generation unit 14, that is, the positions (x, y) of the vehicle V and the driving states (v, θ) of the vehicle V at the times from t=Δt to t=nΔt on the selected trajectory P are read in. Then, based on the positions (x, y) of the vehicle V and the driving states (v, θ) of the vehicle V at these times, the drive control of the engine of the vehicle V and control of the engine auxiliaries etc. are performed at step 31, the control for braking the vehicle V and control of the braking lights etc. are performed at step 32, and the steering control and control of the direction lights etc. are performed at step 33. These controls are updated each time acquiring an updated new driving plan at step 30. In this way, automated driving of the vehicle V along the generated driving plan is performed.

Next, while referring to FIG. 6A, one example of the drive control of an engine of the host vehicle V based on a driving plan which is generated by the driving plan generation unit 14 will be schematically explained. This FIG. 6A shows the road conditions, the vehicle speed "v" of the host vehicle V, and the required drive torque TR with respect to the vehicle V. Note that, in FIG. 6A, the vehicle speed "v" shows one example of the vehicle speed based on the driving plan from the driving plan generation unit 14. The example which is shown in FIG. 6A shows the case where the vehicle V is stopped at the time t=0, the vehicle V is accelerated in operation from the time t=0 to the time t=Δt, the vehicle is driven at a constant speed from the time t=Δt to the time t=7Δt even if the road becomes an upward slope midway, and the vehicle speed "v" is decreased at the downward slope after the time t=7Δt.

In some embodiments, the acceleration A(n) in the direction of advance of the vehicle V, which should be applied to the vehicle V, is found from the vehicle speed "v" based on the driving plan generated by the driving plan generation unit 14, the required drive torque TR for the vehicle V is found from this acceleration A(n), and the drive operation of the engine is controlled so that the drive torque for the vehicle V becomes this required drive torque TR. For example, as shown in FIG. 6B, if assuming that a vehicle of the mass M is accelerated from v(n) to v(n+1) during the time Δt, the acceleration A(n) in the direction of advance of the vehicle at this time, as shown in FIG. 6B, is expressed by acceleration A(n)=(v(n+1)−v(n))/Δt. If assuming the force which acts on the vehicle V at this time to be F, this force F is expressed by the product (=M·A(n)) of the mass M of the vehicle V and the acceleration A(n). On the other hand, if making the radius of the drive wheels of the vehicle V to be "r", the drive torque TR for the vehicle V is expressed by F·r. Therefore, the required drive torque TR for the vehicle V is expressed by C·A(n)(=F·r=M·A(n)·r) where C is a constant.

If the required drive torque TR(=C·A(n)) for the vehicle V is found, the drive operation of the engine is controlled so that the drive torque with respect to the vehicle V becomes this required drive torque TR. Specifically speaking, the engine load, i.e, the opening degree of the throttle valve and the gear ratio of the transmission are controlled so that the drive torque with respect to the vehicle V becomes this required drive torque TR. For example, the gear ratio of the transmission is determined in advance as a function of the vehicle speed "v" and the required drive torque TR, and accordingly, if the vehicle speed "v" and the required drive torque TR are determined, the target gear ratio of the transmission is determined. If the target gear ratio of the transmission is determined, the engine speed and the engine output torque which give the vehicle speed "v" and the required drive torque TR are determined, and if the engine output torque is determined, the target opening degree of the throttle valve which gives this engine output torque is determined. In this way, the target gear ratio of the transmission and the target opening degree of the throttle valve are determined, and the gear ratio of the transmission and the opening degree of the throttle valve are controlled so as to become the target gear ratio of the transmission and the target opening degree of the throttle valve, respectively.

On the other hand, when the road is an upward slope, compared with the case of a flat road, a larger drive torque becomes required to drive the vehicle V. That is, as shown in FIG. 6C, on an upward slope, if making the acceleration of gravity "g" and the slope "θ", an acceleration AX (=g·SIN θ) acts on the vehicle V of the mass M in a direction causing the vehicle V to move backward. That is, a deceleration AX (=g·SIN θ) acts on the vehicle V. At this time, the required drive torque TR for the vehicle V which is required for preventing the vehicle V from moving backward is expressed by C·AX(=F·r=M·AX·r) where C is a constant. Therefore, when the vehicle V is being driven on an upward slope, the required drive torque TR for the vehicle V is made to increase by exactly this drive torque C·AX.

Therefore, in the example which is shown in FIG. 6A, the required drive torque TR for the vehicle V is increased during the period of the time t=0 to the time t=Δt when the vehicle V is being operated under acceleration, the required drive torque TR for the vehicle V is decreased somewhat during the period of the time t=Δt to the time t=3Δt when the vehicle V is being driven on a flat road, the required drive torque TR for the vehicle V is greatly increased during the period of the time t=3Δt to the time t=5Δt when the vehicle V is being driven on an upward slope at a constant speed, the required drive torque TR for the vehicle V is decreased, compared with when being driven on an upward slope at a constant speed, during the period from the time t=5Δt to the time t=7Δt when the vehicle V is being driven on a flat road at a constant speed, and the required drive torque TR for the vehicle V is further decreased during the period after the time t=7Δt when the vehicle V is being driven on a downward slope while decelerated somewhat.

Figure 7:
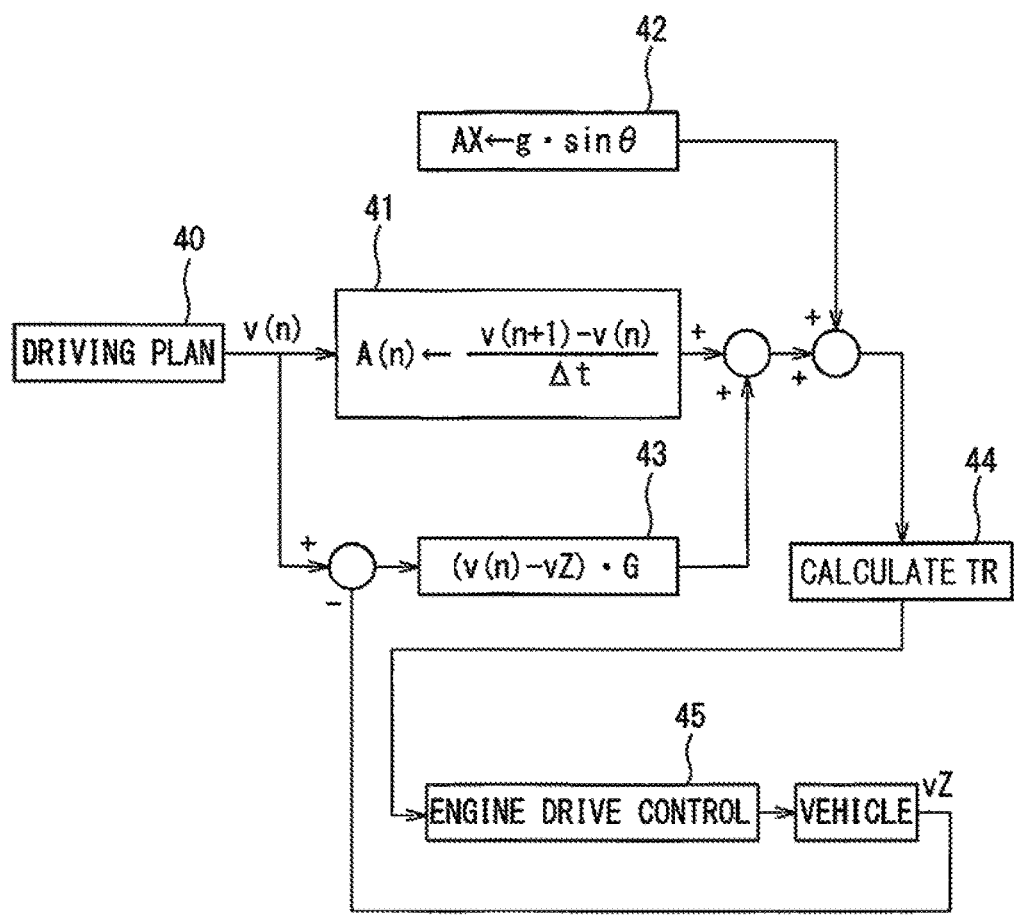
FIG. 7 is a view of the control structure of the engine drive control based on a driving plan of a vehicle, in accordance with same embodiments.

FIG. 7 shows a view of the control structure of the engine drive control based on a driving plan of the vehicle. If the vehicle speed at the current time (time=0) which is generated based on the driving plan 40 is made "v(0)", in some embodiments, feed forward control which controls the vehicle speed at the time t=Δt after the Δt time to the vehicle speed v(1) generated based on the driving plan 40 and feedback control which controls the actual vehicle speed to the vehicle speed "v" generated based on the driving plan 40 are performed simultaneously in parallel. In this case, it is difficult to understand these feed forward control and feedback control if explained simultaneously, so first the feed forward control will be explained, then the feedback control will be explained.

Referring to FIG. 7, in the feed forward control unit 41, the acceleration A(0)=v(1)−v(0))/Δt in the direction of advance of the vehicle V when changing the vehicle speed from v(0) to v(1) is calculated based on the vehicle speed v(0) at the current time (time t=0) which is generated based on the driving plan 40 and the vehicle speed v(1) at the time t=Δt which is generated based on the driving plan 40. On the other hand, in the slope correction unit 42, the acceleration AX (=g·SIN θ) at the upward slope or downward slope which was explained referring to FIG. 6C is calculated. Acceleration A(0) obtained by the feed forward control unit 41 and acceleration AX obtained by the slope correction unit 43 are added, and in the calculation unit 44 of the required drive torque TR, the required drive torque TR for the vehicle V is calculated from the sum (A(0)+AX) of the acceleration A(0) obtained by the feed forward control unit 41 and the acceleration AX obtained by the slope correction unit 42.

This sum (A(0)+AX) of the acceleration expresses the acceleration which is required, for making the vehicle speed change from v(0) to v(1). Therefore, if changing the required drive torque TR for the vehicle V based on this sum (A(0)+AX) of acceleration, the vehicle speed at the time t=Δt is calculated as becoming v(1). Therefore, in the next engine drive control unit 45, the drive operation of the engine is controlled so that the drive torque for the vehicle V becomes this required drive torque TR and thereby the vehicle is automatically driven. If changing the required drive torque TR for the vehicle V based on this sum (A(0)+AX) of acceleration in this way, the vehicle speed at the time t=Δt is calculated as becoming v(1). However, the actual vehicle speed deviates from v(1). To eliminate this deviation, feedback control is performed.

That is, in the feedback control unit 43, the required drive torque TR for the vehicle V is controlled by feedback so that the difference (=v(n)−vz) of the current vehicle speed v(n) which is generated based on the driving plan 40 and the actual vehicle speed vz becomes zero, that is, the actual vehicle speed vz becomes the current vehicle speed v(n) which is generated based on the driving plan 40. Giving a specific example, when the current vehicle speed is v(0), in the feedback control unit 41, the value (v(0)−vz)·G which is obtained by multiplying the difference (=v(0)−vz) of the current vehicle speed v(0) and the actual vehicle speed vz with a predetermined gain G is calculated, and the value of (v(0)−vz)·G which is obtained by the feedback control unit 41 is added to the acceleration A(0) which is obtained by the feed forward control unit 41.

In this way, the actual vehicle speed vz is controlled to the vehicle speed v(n) which is generated based on the driving plan 40. Note that, at the driving plan 40, the vehicle speeds v(0), v(1), v(2) . . . at the times t=0, t=Δt, t=2Δt . . . are generated. In the feed forward control unit 41, the accelerations A(0), A(1), A(2) . . . in the direction of advance of the vehicle V at the times t=0, t=Δt, t=2Δt . . . are calculated based on these vehicle speeds v(n), while in the calculation unit 44 of the required drive torque TR, the required drive torque TR for the vehicle V at the times t=0, t=Δt, t=2Δt . .

. are calculated based on these accelerations A(0), A(1), A(2). That is, in the calculation unit 44 of the required drive torque TR, the predicted values of the future required drive torque TR at the times t=0, t=Δt, t=2Δt . . . are calculated.

Figure 8:
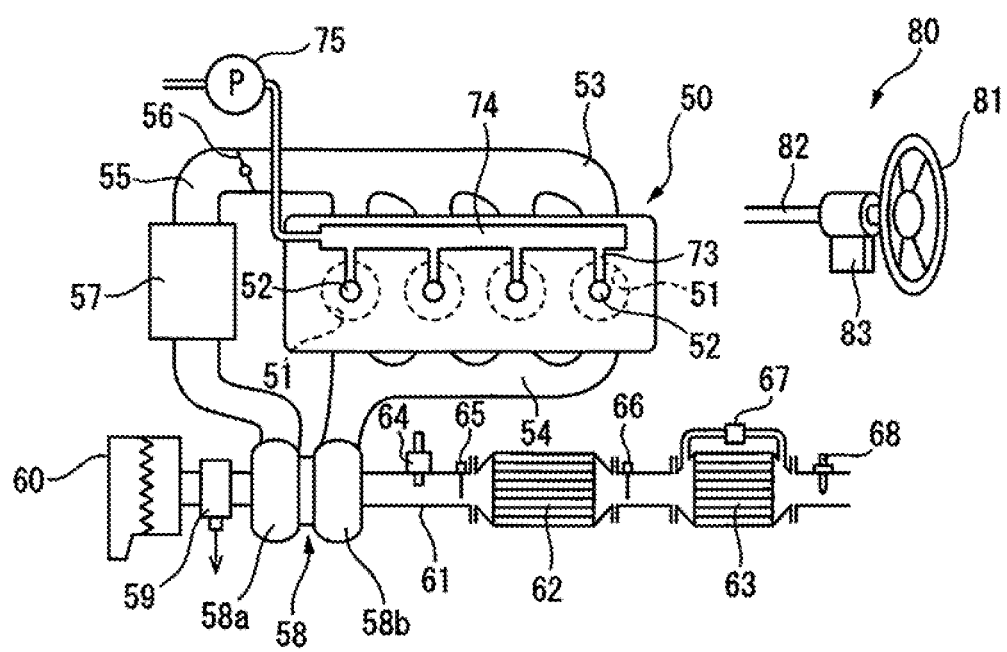
FIG. 8 is an overall view of an internal combustion engine configured to be controlled by the automated driving system, in accordance with some embodiments.

Next, the drive control of the engine and the steering system based on the predicted value of this calculated required drive torque TR will be briefly explained. Note that, prior to explaining the drive control of the engine and the steering system, the engine part which relates to the drive control of the engine and the steering system will be explained in advance. FIG. 8 schematically shows the entirety of the engine and the steering system. Referring to FIG. 8, 50 indicates an engine body, 51 combustion chambers, 52 fuel injectors, 53 an intake manifold, 54 an exhaust manifold, 55 an intake duct, 56 a throttle valve arranged in the intake duct 55, 57 an inter cooler, 58 an exhaust turbocharger, 59 an intake air amount detecting device, and 60 an air cleaner. Intake air is fed into the combustion chambers 51 via the air cleaner 60, the intake compressor 58a of the exhaust turbocharger 58, the intake duct 55 and the intake manifold 53, and the exhaust gas discharged from the combustion chambers 51 into the exhaust manifold 54 is discharged into an exhaust passage 61 via the exhaust turbine 58b of the exhaust turbocharger 58.

An exhaust gas treatment apparatus 62 and an exhaust gas treatment apparatus 63 are arranged in the exhaust passage 61. In the embodiment shown in FIG. 8, the exhaust gas treatment apparatus 62 comprises an $NO_x$ storage reduction catalyst, and the exhaust gas treatment apparatus 63 comprises a particulate filter. The $NO_x$ storage reduction catalyst 62 has a function of storing $NO_x$ contained in the exhaust gas when the air-fuel ratio of the exhaust gas is lean and releasing the stored $NO_x$ when the air-fuel ratio of the exhaust gas is made rich. Accordingly, when the engine is operating, $NO_x$ contained in the exhaust gas is stored in the $NO_x$ storage reduction catalyst 62. In this case, in addition to $NO_x$, sulfur oxides contained in the exhaust gas, i.e., $SO_x$ is stored in the $NO_x$ storage reduction catalyst 62. On the other hand, exhaust particulates contained in the exhaust gas, so called PM is trapped by the particulate filter 63.

Figure 9A:
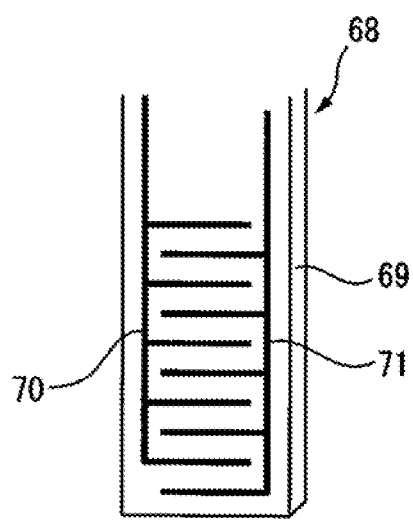
FIG. 9A is a view for explaining an exhaust particulate sensor, in accordance with some embodiments.
Figure 9B:
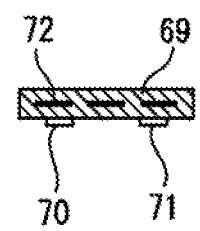
FIG. 9B is a view for explaining an exhaust particulate sensor, in accordance with some embodiments.

As shown in FIG. 8, a fuel feed valve 64 for feeding an additional fuel into the exhaust gas is arranged in the exhaust passage 61 upstream of the $NO_x$ storage reduction catalyst 62, and temperature sensors 65, 66 are arranged in the inlet and the outlet of the $NO_x$ storage reduction catalyst respectively. In addition, a differential pressure sensor 67 for detecting the differential pressure ΔP before and after the particulate filter 63 is attached to the particulate filter 63, and a particulate matter sensor 68 is arranged in the exhaust passage 61 downstream of the particulate filter 63. FIG. 9A shows the detecting portion 69 of this particulate matter sensor 68, and FIG. 9B shows the cross-sectional view of the detecting portion 69 of this particulate matter sensor 68. The detecting portion 69 of this particulate matter sensor 68 is exposed to the exhaust gas, and a pair of comb shaped thin film electrodes 70, 71 which are spaced and arranged so as to mesh with each other are formed on the surface of the detecting portion 69, which is formed by an electric insulator. A fixed voltage is applied between a pair of the thin film electrodes 70, 71. In addition, as shown in FIG. 9B, an electrical heater 72 is embedded in the detecting portion 69.

Turning to FIG. 8 again, each fuel injector 52 is connected to a common rail 74 via corresponding fuel supply tube 73. Fuel is fed to the common rail 74 via a fuel pump 75. Fuel which is fed to the common rail 74 is fed to each fuel injector 52 via the corresponding fuel supply tube 73 and injected from each fuel injector 52 into the corresponding combustion chamber 51. On the other hand, in FIG. 8, 80 indicates a steering apparatus, and this steering apparatus 80 is provided with a steering wheel 81, a steering shaft 82 for transmitting the rotation power of the steering wheel 81 to the steering mechanism of the steering wheels, and an electric power steering system 83. If a command indicating that a steering action should be performed is issued from the driving control unit 15, the steering assist motor of an electric power steering system 83 is driven to rotate the steering shaft 82, and thereby a steering action is performed.

In the embodiment shown in FIG. 8, if the deposited amount of the exhaust particulates on the particulate filter 63 increases and, for example, the differential pressure ΔP before and after the particulate filter 63 exceeds a set value, the regeneration of the particulate filter 63 is caused to be performed. At this time, in the embodiment shown in FIG. 8, fuel is injected from the fuel feed valve 64, and the temperature of the particulate filter 63 is raised due to the heat by the oxidation reaction of this fuel. If the temperature of the particulate filter 63 is raised, the exhaust particulates deposited on the particulate filter 63 are burned.

In addition, as mentioned previously, sulfur oxides contained in the exhaust gas, i.e., $SO_x$ is stored in the $NO_x$ storage reduction catalyst 62. In this case, if the stored amount of $SO_x$ increases, the storing ability of $NO_x$ of the $NO_x$ storage reduction catalyst 62 drops. Accordingly, when the stored amount of $SO_x$ increases, the regeneration of the $NO_x$ storage reduction catalyst 62 for releasing the stored $SO_x$ is caused to be performed. In this case, it is possible to release the $SO_x$ from the $NO_x$ storage reduction catalyst 62 by raising the temperature of the $NO_x$ storage reduction catalyst 62 and making the air-fuel ratio of the exhaust gas rich. In the embodiment shown in FIG. 8, on one hand, by injecting fuel from the fuel feed valve 64, the temperature of the particulate filter 63 is raised due to the heat by the oxidation reaction of this fuel, and on the other hand, by injecting the additional fuel from the fuel injector 52 in addition to the main fuel, a rich combustion gas is produced in the combustion chamber 51. The releasing action of $SO_x$ is performed by this rich combustion gas.

If, for example, a crack is produced in the particulate filter 63, the amount of the exhaust particulates slipping through the particulate filter 63 increases, and thereby the amount of the exhaust particulates deposited on the surface of the detecting portion 69 of she particulate matter sensor 68 increases. If the amount of the exhaust particulates deposited on the surface of the detecting portion 69 increases, electric current flows between a pair of the thin film electrodes 70, 71 through the deposited exhaust particulates. At this time, the amount of this electric current is proportional to the amount of the deposited exhaust particulates. Accordingly, it is possible to judge that a trouble occurs in the particulate filter 63 when the amount of the electric current flowing between a pair of the thin film electrodes 70, 71 increases. On the other hand, when the detection of a trouble of the particulate filter 63 is completed, the regeneration of the detecting portion 69 of the particulate matter sensor 68 is caused to be performed to remove the deposited exhaust particulates. At this time, the temperature of the detecting portion 69 of the particulate matter sensor 68 is raised by operating the electrical heater 72, and thereby the deposited exhaust particulates are burned and removed.

In this way, in some embodiments, the regeneration process for regenerating the particulate filter 63 by removing the exhaust particulates deposited on the particulate filter 63, and the regeneration process for regenerating the $NO_x$ storage reduction catalyst 62 by removing the sulfur oxides, i.e., $SO_x$ stored in the $NO_x$ storage reduction catalyst 62, that is, the regeneration process for regenerating the exhaust gas treatment apparatus 62, 63 by removing the exhaust particulates or the sulfur oxides accumulated in the exhaust gas treatment apparatus 62, 63 is performed. In this case, in either regeneration process, it is necessary to raise the temperature of the exhaust gas treatment apparatus 62, 63, and fuel is used to raise the temperature of the exhaust gas treatment apparatus 62, 63.

On the other hand, if raising the temperature of the exhaust gas when the exhaust gas treatment apparatus 62, 63 is regenerated, it is possible to reduce the amount of fuel which is consumed for raising the temperature of the exhaust gas treatment apparatus 62, 63. In this case, if increasing the engine load, i.e., increasing the required drive torque TR of the engine, the combustion temperature rises, and thus, the temperature of the exhaust gas rises. As a result, it is possible to reduce the amount of fuel which is consumed when the exhaust gas treatment apparatus 62, 63 is regenerated. In addition, if raising the temperature of the exhaust gas when the detecting portion 69 of the particulate matter sensor 68 is regenerated, it is possible to reduce the amount of electric power which is consumed for raising the temperature of the detecting portion 69 of the particulate matter sensor 58. Therefore, in some embodiments, the driving lane wherein it is predicted that the engine load is increased is selected from a plurality of the driving lanes when the exhaust gas treatment apparatus 62, 63 is regenerated and when the detecting portion 69 of the particulate matter sensor 68 is regenerated. Next, this will be explained with reference to FIG. 10A to FIG. 12.

Figure 10A:
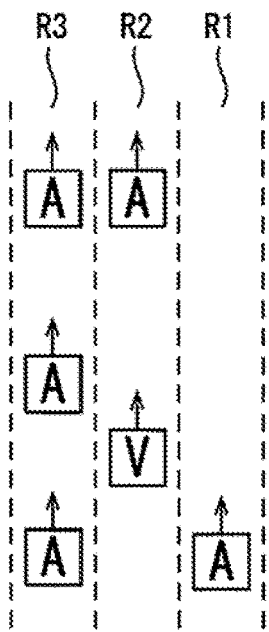
FIG. 10A is a view which schematically shows the turning state of a vehicle, in accordance with some embodiments.

FIG. 10A to FIG. 12 schematically show a road having a plurality of lanes R1, R2, and R3. The lane R1 shows the lane closest to the opposing lane. When, the road shown from FIG. 10A to FIG. 12 is a road exclusively for motor vehicles, R2 and R3 are slow lanes and R1 is a passing lane. In FIG. 10A to FIG. 12, V and A show vehicles running inside the lanes R1, R2, and R3. The directions of advance of the vehicles V and A are shown by arrows. Note that, "V" indicates a host vehicle, while "A" indicates another vehicle. FIG. 10A shows the case of the host vehicle V being automated driven by a target speed "v" in the lane R2. In this case, for example, if assuming another vehicle A running in front of the host vehicle V in the lane R2 decelerates, the host vehicle V is decelerated to less than the target speed "v". If the host vehicle V is decelerated to less than the target speed "v", the engine load, that is, the required drive torque TR of the engine, is reduced compared with when the host vehicle V is being automated driven at the target speed "v", and the exhaust gas temperature also falls compared with when the host vehicle V is being automated driven at the target speed "v". In this regard, in this case, if the degree of congestion of vehicles in the lane R1 was low, at the lane R1, the host vehicle V can run at the target speed "v". Note that, the "degree of congestion of vehicles" here expresses the number of other vehicles A present within a fixed distance, for example, within 100 m before and after the host vehicle V as a reference point, in each of the lanes R1, R2, R3. For example, when there are two or less other vehicles A present within 100 m before and after the position of the vehicle V as a reference point, it is deemed that the degree of congestion of the vehicles is low.

Now, if the degree of congestion of vehicles is low, the host vehicle V can be driven continuously by the target speed "v", therefore it is predicted that the engine load, that is, the requested drive torque TR of the engine of the host vehicle V, will increase. Therefore, in some embodiments, in the case shown in FIG. 10A, the degrees of congestion of vehicles at the lanes R1, R2, and R3 are detected based on the information of surroundings of the vehicle which is detected by the external sensor 1, and when performing the regeneration process for regenerating the exhaust gas treatment apparatus 62, 63, the lane with the low degree of congestion, that is, the lane predicted as increasing the engine load, is selected from the lanes R1, R2, and R3. In the case shown in FIG. 10A, the degree of congestion of vehicles at the lane R1 is low, therefore when performing the regeneration process for regenerating the exhaust gas treatment apparatus 62, 63, the lane R1 is selected from these lanes R1, R2, and R3. Note that, in this case, preferably the lane predicted as resulting in the highest engine load in the plurality of lanes is selected.

If the lane R1 is selected, the host vehicle V is changed in lane from the lane R2 to the lane R1. At this time, in some embodiments, as shown by the arrow extending from the host vehicle V to the front in FIG. 10B, a plurality of vehicle rotating, paths showing the change along with time of the speed "v" and advancing direction θ of the host vehicle V are generated at the driving plan generation unit 14. Next, in the driving plan generation unit 14, a single vehicle running path enabling a destination to be reached safely in the shortest time while observing the law is selected from these plurality of vehicle running paths, and the host vehicle V is automated driven along this selected vehicle running path.

Note that, when it is judged that the road the host vehicle V is running on is a road exclusively for motor vehicles based on the information of surroundings of the vehicle which is detected by the external sensor 1 and the map information, it is predicted that the engine load will increase the most when the host vehicle V is running in the passing lane. If there are a plurality of driving lanes, among the plurality of driving lanes, it is predicted that the engine load will increase the most when the host vehicle V is running on the driving lane close to the passing lane. Therefore, in some embodiments, if the road on which the host vehicle V is running is a road exclusively for motor vehicles, when performing the regeneration process for regenerating the exhaust gas treatment apparatus 62, 63, the passing lane or the driving lane close to the passing lane among the plurality of driving lanes is selected as the lane predicted as increasing the engine load.

Figure 11:
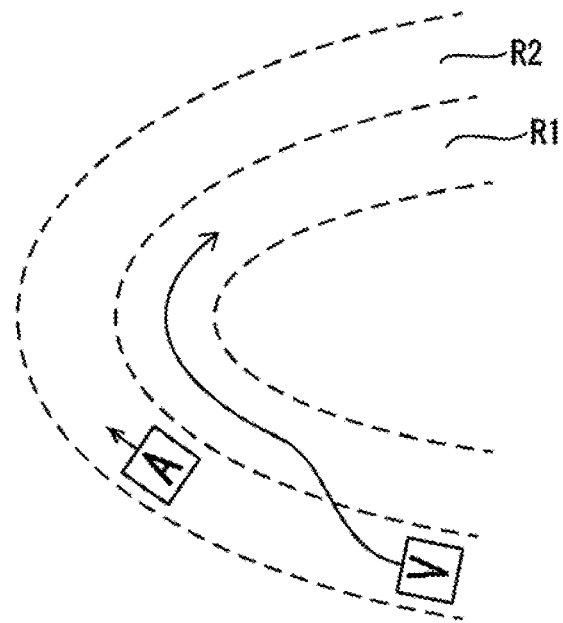
FIG. 11 is a view which schematically shows the running state of a vehicle, in accordance with some embodiments.

On the other hand, when the host vehicle V is driving on an upward slope, it is predicted that the engine load is increased the most when the host vehicle V is driving on the lane with the steepest upward slope among the plurality of the lanes. Therefore, in some embodiments, in case where it is predicted that there will be an upward slope based on the information of surroundings of the vehicle which is detected by the external sensor 1 and the map information, when performing the regeneration process of the exhaust gas treatment apparatuses 62, 63, the lane with a sharper upward slope is selected among the plurality of lanes. FIG. 11 shows the case where the upward slope is a curved road. In this case, the slope of the inside lane R1 is sharper than the slope of the outside lane R2. Therefore, in some embodiments, in case where the upward slope is a curved road, when performing the regeneration process of the exhaust gas treatment apparatus 62, 63, the lane positioned at the inside among the plurality of the lanes is selected. Therefore, as shown in FIG. 11, when the host vehicle V is running in the outside lane R2, the host vehicle V is changed in lane from the outside lane R2 to the inside lane R1.

Figure 12:
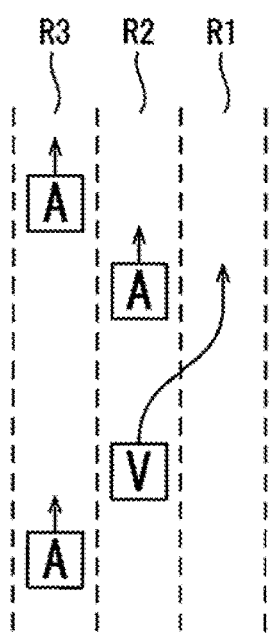
FIG. 12 is a view which schematically shows the running state of a vehicle, in accordance with some embodiments.

On the other hand, as shown in FIG. 12, when the host vehicle V is running following another vehicle A in the lane R2, the air resistance received by the host vehicle V becomes lower compared with the air resistance received by the other vehicle A. As a result, the engine load of the host vehicle V becomes lower. In this case, to raise the engine load of the host vehicle V, it is necessary to make the host vehicle V run without following the other vehicle A. Therefore, in some embodiments, in case where it is judged that the host vehicle V is running following the other vehicle A based on the information of surroundings of the vehicle which is detected by the external sensor 1, when performing the regeneration process for regenerating the exhaust gas treatment apparatus 62, 63, a lane on which the host vehicle V can run without following the other vehicle A is selected. Therefore, as shown in FIG. 12, when the host vehicle V is running in the outside lane R2 following the other vehicle A, the host vehicle V is changed in lane from the lane R2 to the lane R1 where the vehicle V can run without following the other vehicle A.

Figure 13:
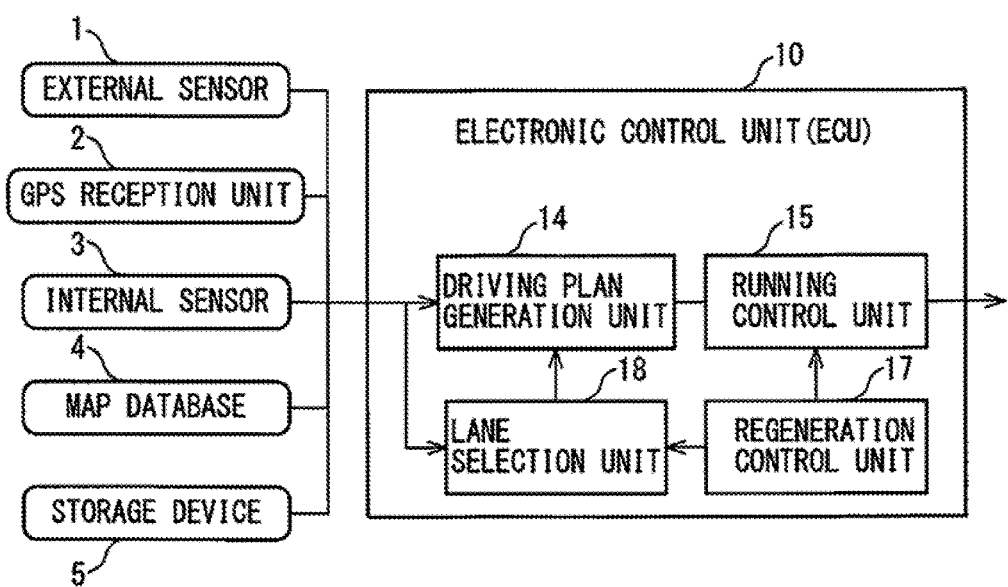
FIG. 13 is a block diagram for explaining a function of the configuration of an automated driving system, in accordance with some embodiments.

In this way, according to some embodiments, as shown by the block diagram for explaining the functions of the configurations of the automated driving system of FIG. 13, there is provided a control system of an automated driving vehicle comprising an external sensor 1 which detects information of surroundings of the vehicle and an electronic control unit 10 which is configured to control an automated driving of the vehicle based on the information of surroundings of the vehicle which is detected by the external sensor 1 and map information. The electronic control unit 10 includes a driving plan generation unit 14 which generates a vehicle driving plan following a preset target route based on the information of surroundings of the vehicle which is detected by the external sensor 1 and the map information. A driving control unit 15 is provided which performs control for driving the engine so that the vehicle runs along a target driving route generated by the driving plan generation unit 14. A regeneration control unit 17 is provided which is configured to control the regeneration process for regenerating engine exhaust gas treatment apparatus 62, 63 by removing particulate matter or sulfur oxides built up at the exhaust gas treatment apparatus 62, 63. A lane selection unit 18 is also provided which selects a lane predicted as increasing the engine load among a plurality of lanes based on the information of surroundings of the vehicle which is detected by the external sensor 1 and the map information when the regeneration of the exhaust gas treatment apparatus 62, 63 is caused to be performed by the regeneration control unit 17. The vehicle is made to be automated driven along the lane selected by the lane selection unit 18 when the regeneration process for regenerating the exhaust gas treatment apparatus 62, 63 is being performed. In some embodiments, the regeneration process for regenerating the exhaust gas treatment apparatus 62, 63 occurs for a period of time greater than a period of time that the regeneration control unit 17 controls the regeneration process to be performed, and the vehicle is made to be automated driven along the lane selected by the lane selection unit 18 for the period of time during which the regeneration control unit 17 is controlling the performance of the regeneration process for regenerating the exhaust gas treatment apparatus 62, 63. In some embodiments, the regeneration process for regenerating the exhaust gas treatment apparatus 62, 63 occurs for a period of time greater than a period of time that the regeneration control unit 17 controls the regeneration process to be performed, and the vehicle is made to be automated driven along the lane selected by the lane selection unit 18 for at least the period of time during which the regeneration control unit 17 is controlling the performance of the regeneration process for regenerating the exhaust gas treatment apparatus 62, 63.

Figure 14:
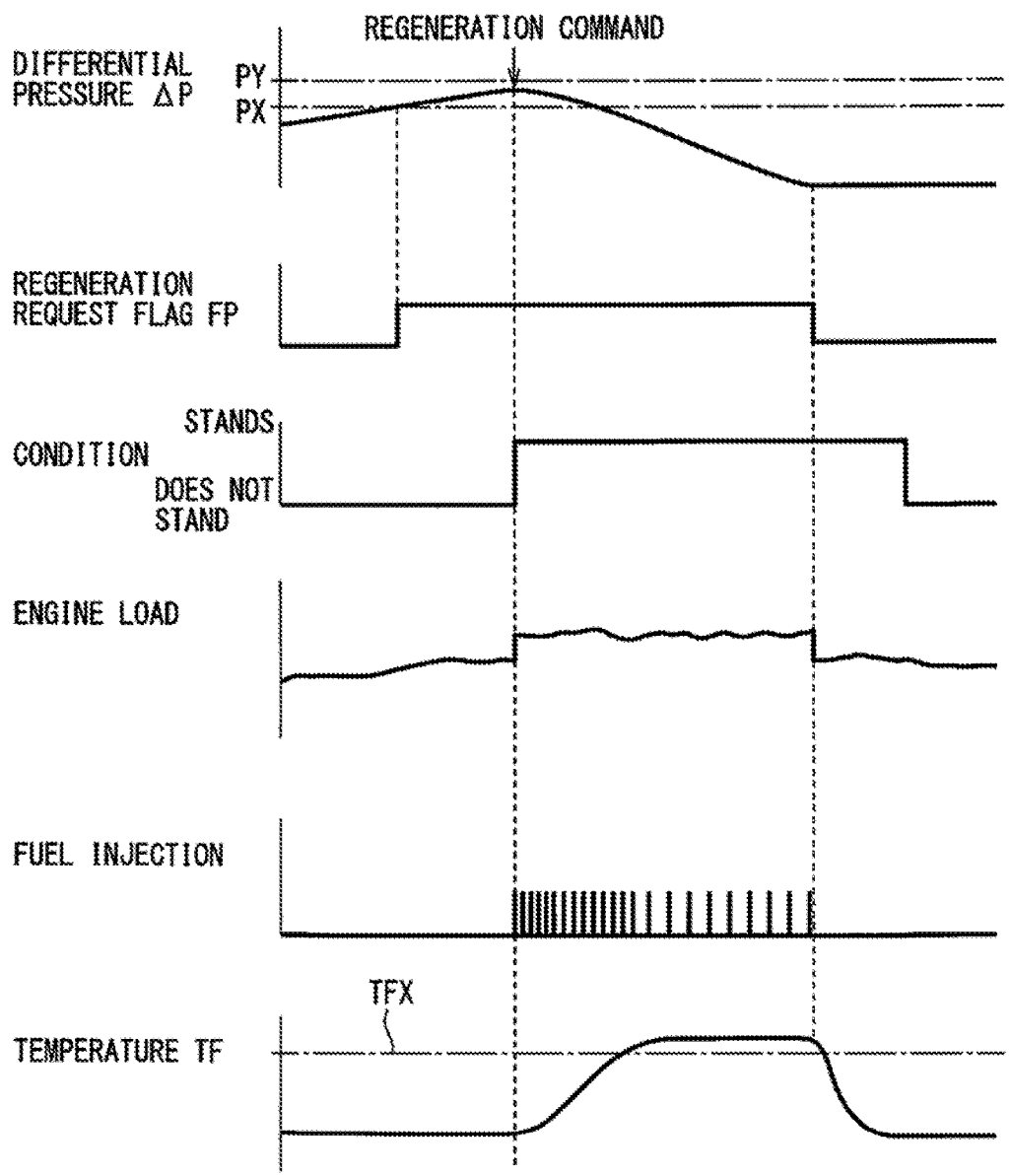
FIG. 14 is a timing diagram which shows the regeneration control of a particulate filter, in accordance with some embodiments.

FIG. 14 shows a timing diagram for controlling the regeneration process for regenerating the particulate filter 63, in accordance with some embodiments. Referring to FIG. 14, FIG. 14 shows the change of the differential pressure ΔP before and after the particulate filter 63, the change of the regeneration request flag FP of the particulate filter 63, whether the condition enabling increase of the engine load stands, that is, whether the vehicle can be automated driven along the lane selected by the lane selection unit 18, the change of the engine load, the fuel injection from the fuel feed valve 64 to the exhaust passage 61, and the change of temperature TF of the particulate filter 63. Note that, as shown in FIG. 14, with the respect to the differential pressure ΔP before and after the particulate filter 63, a first reference value PX, and a second reference value PY larger than the first reference value PX are set in advance. The first reference value PX shows the differential pressure ΔP when there is leeway in the amount of deposition of the particulate matter at the particulate filter 63 with respect to the allowable value, while the second reference value PX shows the differential pressure ΔP when the amount of deposition of the particulate matter at the particulate filter 63 reaches the allowable value.

As shown in FIG. 14, if the differential pressure ΔP before and after the particulate filter 63 detected by the differential pressure sensor 67 exceeds the preset first reference value PX, the regeneration request flag FP of the particulate filter 63 is set. At this time, there is still leeway of the amount of deposition of particulate matter to the particulate filter 63 with respect to the allowable value, so even if the regeneration request flag FP of the particulate filter 63 is set, it is waited until the condition for increase of the engine load stands, that is, until the vehicle can be automated driven along the lane selected by the lane selection unit 18. If the condition for increase of the engine load stands, that is, if the vehicle starts to be automated driven along the lane selected by the lane selection unit 18, a regeneration command is issued and the engine load is made to increase. If the engine load is made to increase, additional fuel is injected from the fuel feed valve 64 and the regeneration control unit 17 causes the regeneration process of the particulate filter 63 to be started.

If the regeneration process of the particulate filter 63 is started, the temperature TF of the particulate filter 63 gradually rises. At this time, the engine load is made to increase, and thus the exhaust gas temperature is high. Therefore, it is possible to raise the temperature TF of the particulate filter 63 until the particulate matter combustion temperature TFX by using a small amount of fuel. If the temperature TF of the particulate filter 63 exceeds the particulate matter combustion temperature TFX, combustion of the particulate matter deposited on the particulate filter 63 is started and the particulate matter deposited on the particulate filter 63 is gradually removed. As a result, the differential pressure ΔP before and after the particulate filter 63 gradually falls. If the differential pressure ΔP before and after the particulate filter 63 becomes the set value or less, the regeneration control unit 17 causes the regeneration process of the particulate filter 63 to end.

Figure 15:
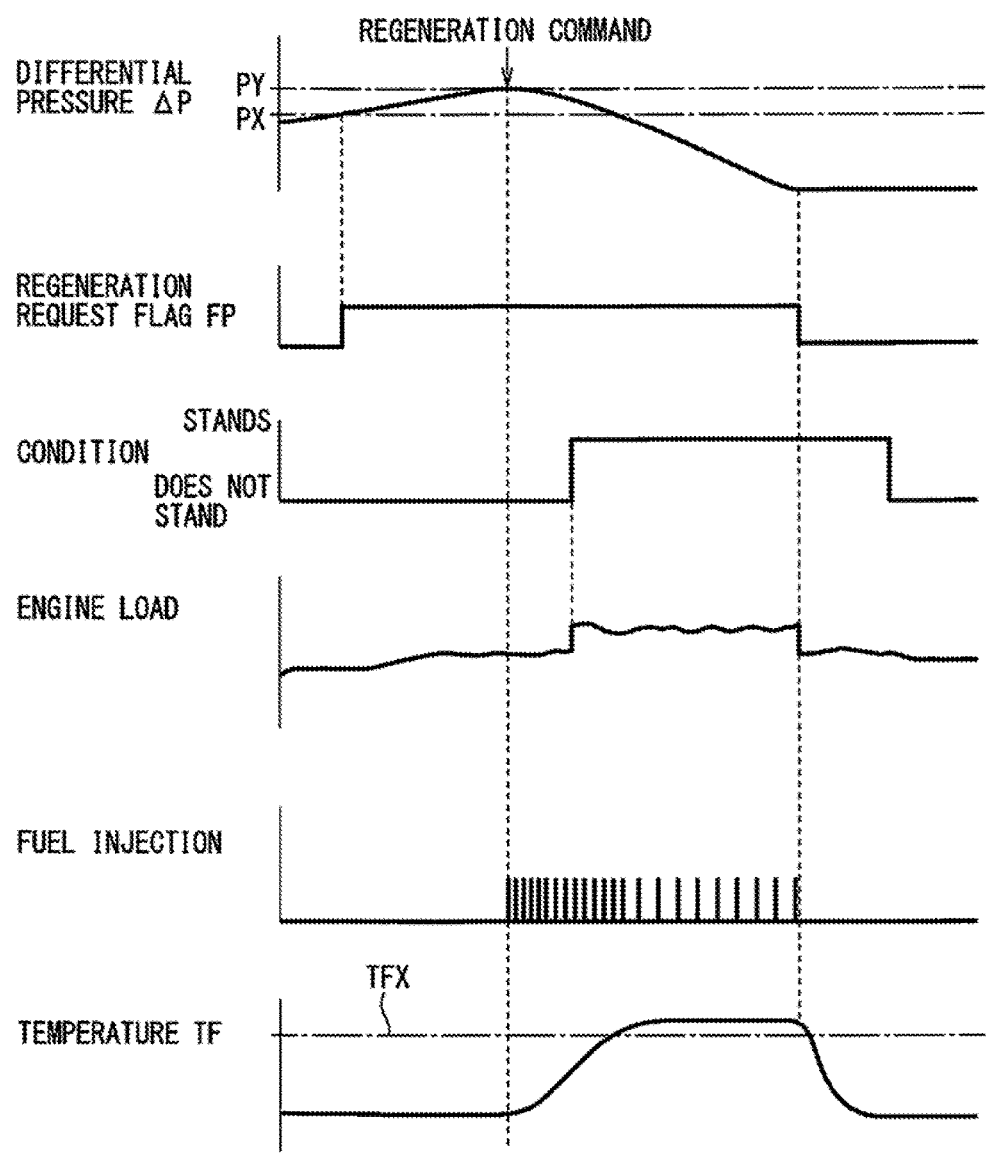
FIG. 15 is a timing diagram which shows the regeneration control of a particulate filter, in accordance with some embodiments.

FIG. 15 shows a case when after the regeneration request flag FP of the particulate filter 63 is set, but before the condition enabling increase of the engine load stands, the differential pressure ΔP before and after the particulate filter 63 detected by the differential pressure sensor 67 exceeds the preset second reference value PY, in accordance with some embodiments. Immediately after the differential pressure ΔP before and after the particulate filter 63 exceeds the preset second reference value PY, a regeneration command is issued and the regeneration control unit 17 causes the regeneration process of the particulate filter 63 to be started. Next, when the condition enabling increase of the engine load stands, the vehicle starts to be automated driven along the lane selected by the lane selection unit 18 and the engine load is made to increase.

Figure 16:
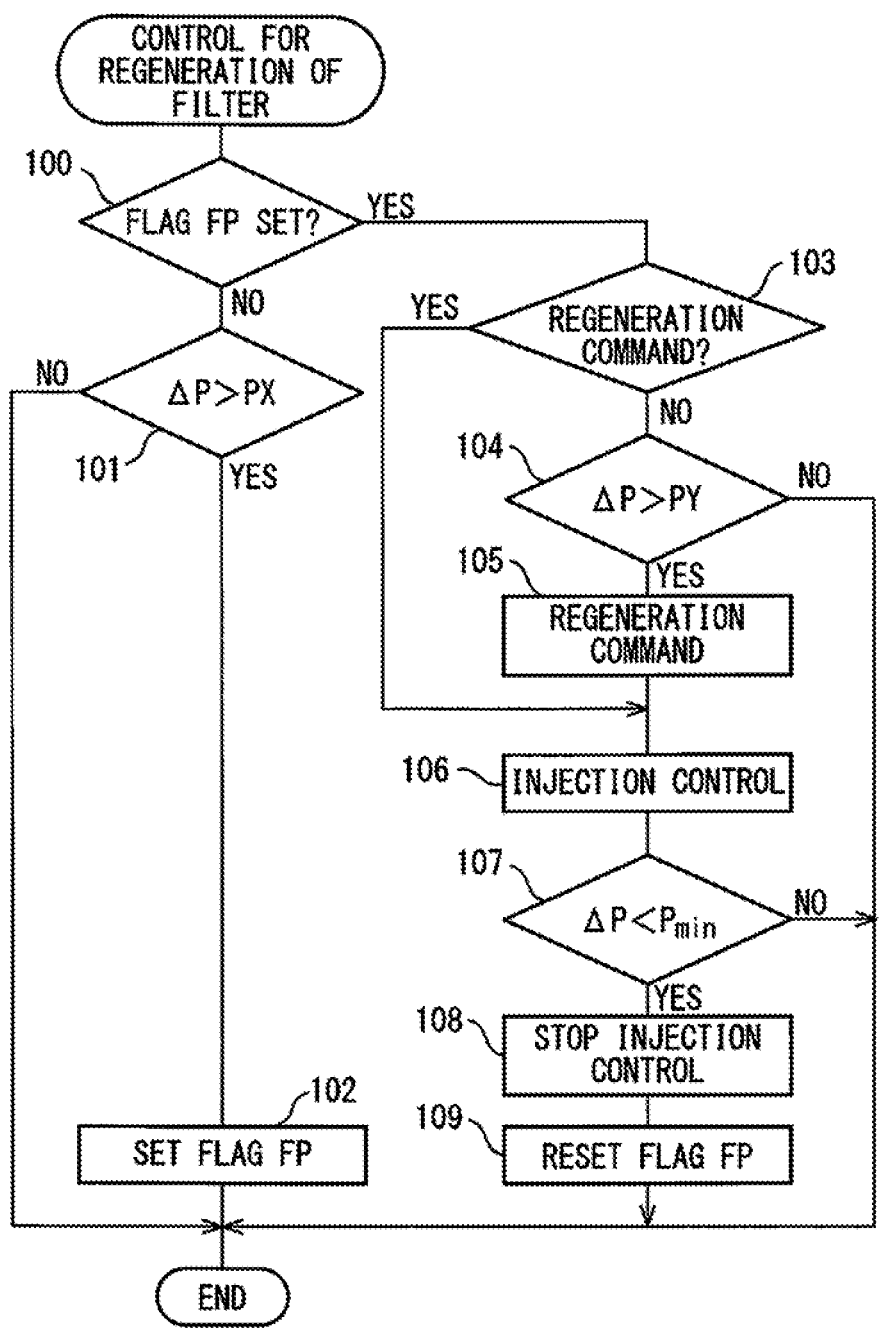
FIG. 16 is a flow chart for performing the regeneration control of a particulate filter, in accordance with some embodiments.

FIG. 16 shows a routine for controlling a regeneration process for regenerating of the particulate filter 63, in accordance with some embodiments. Note that, this routine is performed by interruption every fixed time period. Referring to FIG. 16, first, at step 100, it is judged if the regeneration request flag FP of the particulate filter 63 is set. When the regeneration request flag FP of the particulate filter 63 is not set, the routine proceeds to step 101 where it is judged if the differential pressure ΔP before and after the particulate filter 63 exceeds the first reference value PX. If the differential pressure ΔP before and after the particulate filter 63 exceeds the first reference value PX, the routine proceeds to step 102 where the regeneration request flag FP of the particulate filter 63 is set. If the regeneration request flag FP of the particulate filter 63 is set, at the next processing cycle, the routine proceeds from step 100 to step 103.

At step 103, it is judged if the regeneration command has been issued. When the command for regeneration of the particulate filter 63 has been issued, the routine jumps to step 106. As opposed to this, when the regeneration command is not issued, the routine proceeds to step 104 where it is judged if the differential pressure ΔP before and after the particulate filter 63 exceeds the second reference value PY. If the differential pressure ΔP before and after the particulate filter 63 exceeds the second reference value PY, the routine proceeds to step 105 where a regeneration command is issued, then the routine proceeds to step 106.

At step 106, additional fuel is injected from the fuel feed valve 64. Next, at step 107, it is judged if the differential pressure ΔP before and after the particulate filter 63 becomes the set value Pmin or less. When it is judged that the differential pressure ΔP before and after the particulate filter 63 becomes the set value Pmin or less, the routine proceeds to step 108 where the fuel injection from the fuel feed valve 64 is stopped, then at step 109, the regeneration request flag FP of the particulate filter 63 is reset. If the regeneration request flag FP of the particulate filter 63 is reset, the control for increase of the engine load is stopped and the regeneration command is withdrawn. Next, normal automated driving without control for increase of the engine load is performed.

Figure 17:
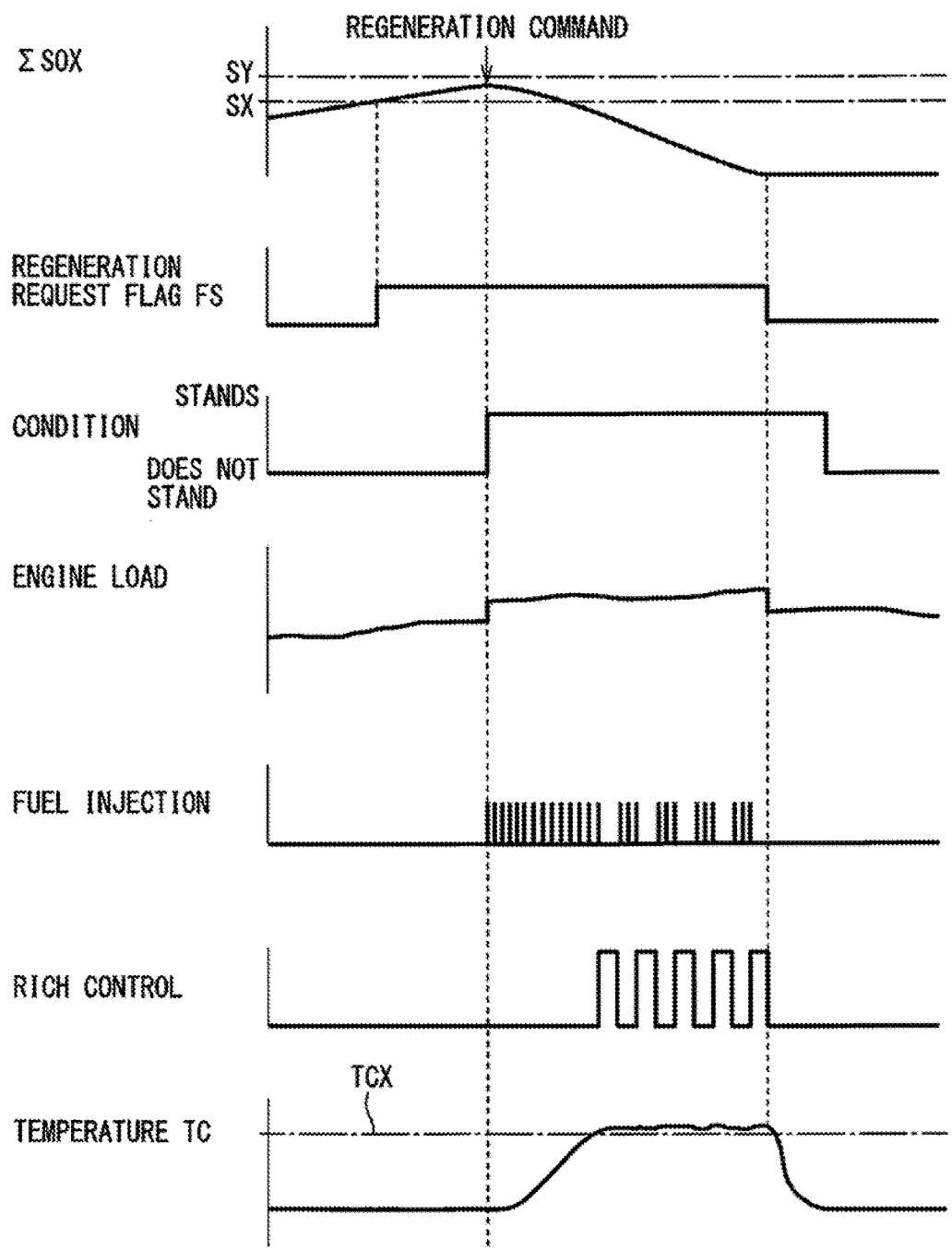
FIG. 17 is a timing diagram which shows the regeneration control of an $NO_x$ storage reduction catalyst, in accordance with some embodiments.

FIG. 17 shows a timing diagram for controlling a regeneration process for regenerating the $NO_x$ storage reduction catalyst 62, in accordance with some embodiments. Referring to FIG. 17, FIG. 17 shows the change in the $SO_x$ amount ΣSOX stored in the $NO_x$ storage reduction catalyst 62, the change in the regeneration request flag FS of the $NO_x$ storage reduction catalyst 62, whether the condition enabling increase of the engine load stands, that is, whether the vehicle can be automated driven along the lane selected by the lane selection unit 18, the change of the engine load, the fuel injection from the fuel feed valve 64 to the exhaust passage 61, rich control for generating rich combustion gas in the combustion chamber 51, and the change of the temperature TC of the $NO_x$ storage reduction catalyst 62. Note that, as shown in FIG. 17, a first reference value SX and a second reference value SY larger than the first reference value SX are set in advance for the $SO_x$ amount ΣSOX stored in the $NO_x$ storage reduction catalyst 62. The first reference value SX shows the $SO_x$ amount ΣSOX when there is still leeway of the $SO_x$ storage amount at the $NO_x$ storage reduction catalyst 62 with respect to the allowable value, while the second reference value SX shows the $SO_x$ amount ΣSOX when the $SO_x$ storage amount at the $NO_x$ storage reduction catalyst 62 reaches the allowable value.

As shown in FIG. 17, if the $SO_x$ amount ΣSOX stored in the $NO_x$ storage reduction catalyst 62 exceeds the preset first reference value SX, the regeneration request flag FS of the $NO_x$ storage reduction catalyst 62 is set. At this time, there is still leeway of the $SO_x$ storage amount in the $NO_x$ storage reduction catalyst 62 with respect to the allowable value, so even if the regeneration request flag FS of the $NO_x$ storage reduction catalyst 62 is set, it is waited until the condition enabling increase of the engine load stands, that is, until the vehicle can be automated driven along the lane selected by the lane selection unit 18. If the condition enabling increase of the engine load stands, that is, if the vehicle starts to be automated driven along the lane selected by the lane selection unit 18, a regeneration command is issued and the engine load is increased. If the engine load is made to increase, additional fuel is injected from the fuel feed valve 64 and the regeneration control unit 17 causes the regeneration process for regenerating the $NO_x$ storage reduction catalyst 62 to be started.

If the regeneration process of the $NO_x$ storage reduction catalyst 62 is started, the temperature TC of the $NO_x$ storage reduction catalyst 62 gradually rises. At this time, the engine load is made to increase, and thus the exhaust gas temperature is high. Therefore it is possible to make the temperature TC of the $NO_x$ storage reduction catalyst 62 rise to the $SO_x$ release temperature TCX by using a small amount of fuel. If the temperature TC of the $NO_x$ storage reduction catalyst 62 exceeds the $SO_x$ release temperature TCX, fuel injection from the fuel feed valve 64 for maintaining the temperature TC of the $NO_x$ storage reduction catalyst 62 at the $SO_x$ release temperature TCX and rich control for generating rich combustion gas for causing the $NO_x$ storage reduction catalyst 62 to release $SO_x$ are alternately performed. Due to this, $SO_x$ is gradually released from the $NO_x$ storage reduction catalyst 62. If a fixed time elapses from the start of the regeneration process of the $NO_x$ storage reduction catalyst 62, that is, if the action of removal of $SO_x$ from the $NO_x$ storage reduction catalyst 62 is completed, the regeneration control unit 18 causes the regeneration process of the $NO_x$ storage reduction catalyst 62 to end.

Figure 18:
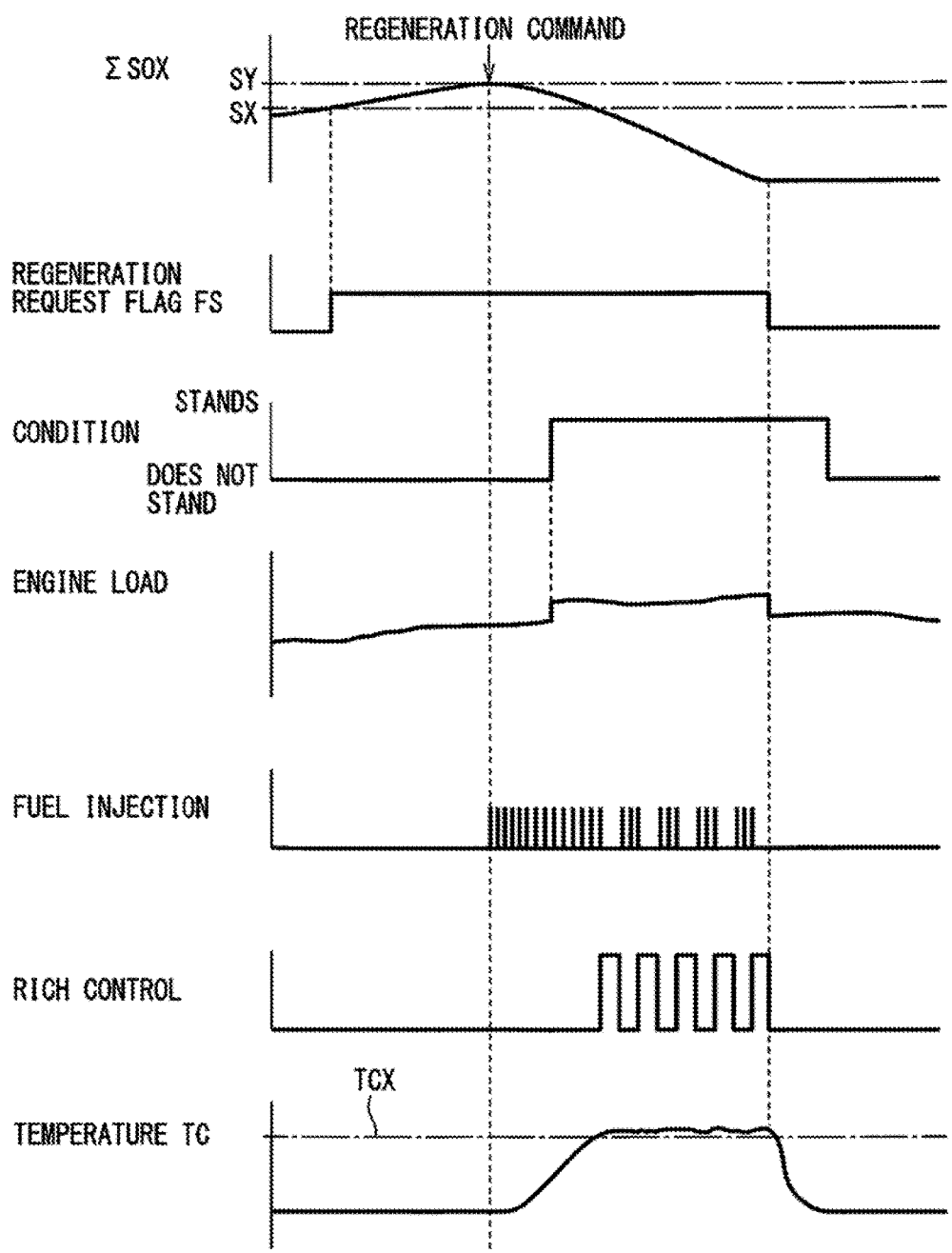
FIG. 18 is a timing diagram which shows the regeneration control of an $NO_x$ storage reduction catalyst, in accordance with some embodiments.

FIG. 18 shows a case when after the regeneration request flag FS of the $NO_x$ storage reduction catalyst 62 is set and before the condition enabling increase of the engine load stands, the $SO_x$ amount ΣSOX stored in the $NO_x$ storage reduction catalyst 62 exceeds the preset second reference value SY, in accordance with some embodiments. If the $SO_x$ amount ΣSOX stored in the $NO_x$ storage reduction catalyst 62 exceeds the preset second reference value SY, a regeneration command is immediately issued and the regeneration control unit 17 causes the regeneration process of the $NO_x$ storage reduction catalyst 62 to be started. Next, when the condition enabling increase of the engine load stands, the vehicle starts to be automated driven along the lane selected by the lane selection unit 18 and the engine load is made to increase.

Figure 19:
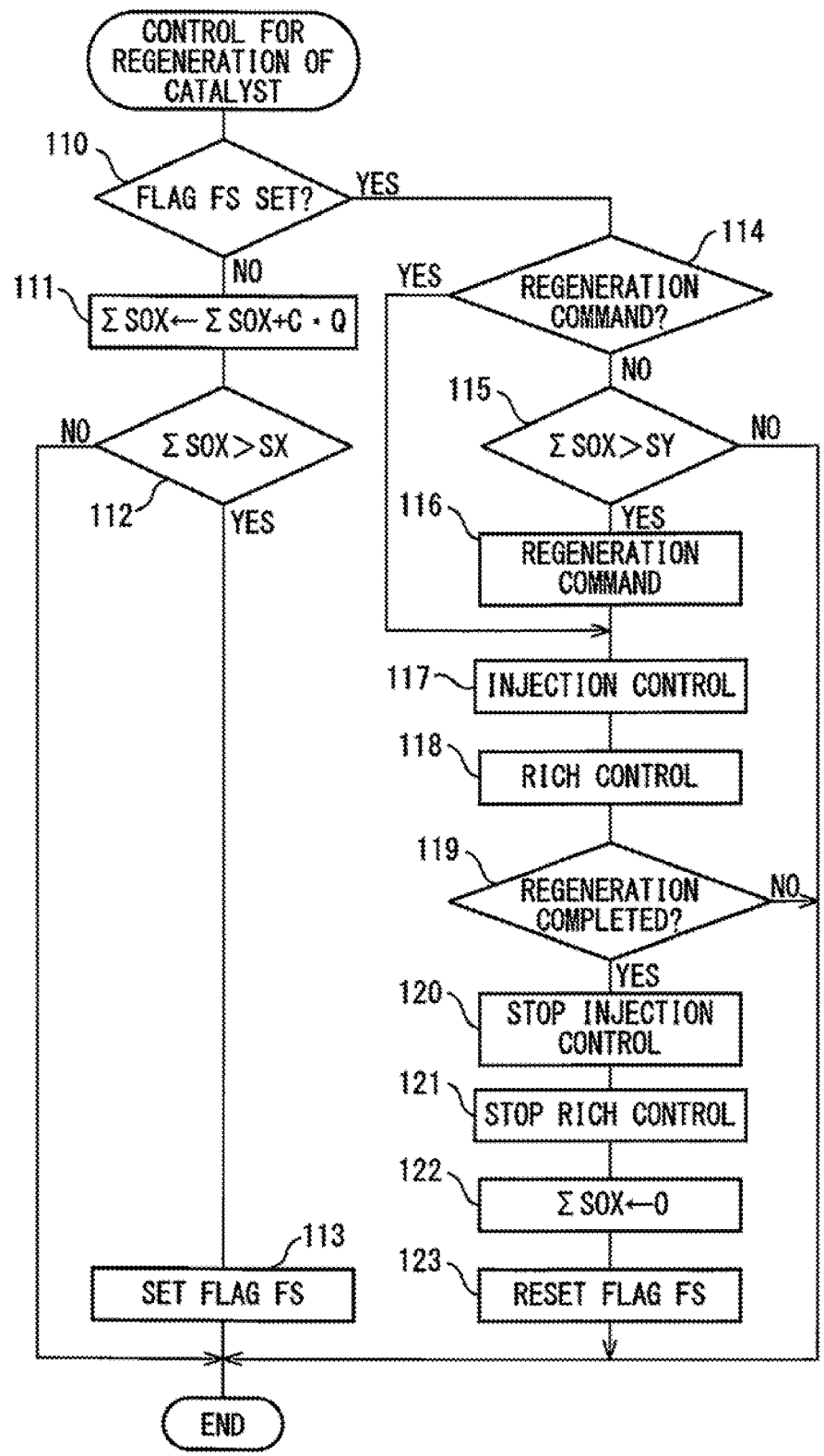
FIG. 19 is a flow chart, for performing the regeneration control of an $NO_x$ storage reduction catalyst, in accordance with some embodiments.

FIG. 19 shows a routine for controlling a regeneration process of the $NO_x$ storage reduction catalyst 62, in accordance with some embodiments. Note that, this routine is performed by interruption every fixed time period. Referring to FIG. 19, first, at step 110, it is judged if the regeneration request flag FS of the $NO_x$ storage reduction catalyst 62 is set. When the regeneration request flag FS of the $NO_x$ storage reduction catalyst 62 is not set, the routine proceeds to step 111 where the stored $SO_x$ amount $\Sigma SOX$ stored in the $NO_x$ storage reduction catalyst 62 is calculated. That is, the fuel injected from the fuel injector 52 contains a sulfur component in a certain ratio. Therefore, as shown in step 111, the stored $SO_x$ amount $\Sigma SOX$ is calculated by adding the value C·Q obtained by multiplying the fuel injection amount Q from the fuel injector 52 with the constant C to the $SO_x$ amount $\Sigma SOX$.

Next, at step 112, it is judged if the stored $SO_x$ amount $\Sigma SOX$ exceeds the first reference value SX. If the stored $SO_x$ amount $\Sigma SOX$ exceeds the first reference value SX, the routine proceeds to step 113 where the regeneration request flag FS of the $NO_x$ storage reduction catalyst 62 is set. If the regeneration request flag FS of the $NO_x$ storage reduction catalyst 62 is set, at the next processing cycle, the routine proceeds from step 110 to step 114. At step 114, it is judged if the command for regeneration of the $NO_x$ storage reduction catalyst 62 has been issued. When, the command for regeneration of the $NO_x$ storage reduction, catalyst 62 has been issued, the routine jumps to step 117. As opposed to this, when the regeneration command is not issued, the routine proceeds to step 115 where it is judged if the stored $SO_x$ amount $\Sigma SOX$ stored in the $NO_x$ storage reduction catalyst 62 exceeds the second reference value SY. If the stored $SO_x$ amount $\Sigma SOX$ stored in the $NO_x$ storage reduction catalyst 62 exceeds the second reference value SY, the routine proceeds to step 116 where a regeneration command is issued, then the routine proceeds to step 117.

At step 117, additional fuel is injected from the fuel feed valve 64. Next, at step 118, rich, control for generating rich combustion gas at the combustion chamber 51 is performed. Next, at step 119, it is judged if the action for regeneration of the $NO_x$ storage reduction catalyst 62 has been completed, for example, if a fixed time has elapsed from when the regeneration process of the $NO_x$ storage reduction catalyst 62 was started. When it is judged that a fixed time has elapsed from when the regeneration process of the $NO_x$ storage reduction catalyst 62 was started, the routine proceeds to step 120 where fuel injection from the fuel feed valve 64 is stopped, then at step 121 the rich control is stopped. Next, at step 122, the stored $SO_x$ amount $\Sigma SOX$ is cleared, and next, at step 123, the regeneration request flag FS of the $NO_x$ storage reduction catalyst 62 is reset. If the regeneration request flag FS of the $NO_x$ storage reduction catalyst 62 is reset, the control for increasing the engine load is stopped and the regeneration command is withdrawn. Next, normal automated driving without control for increasing the engine load is performed.

Figure 20:
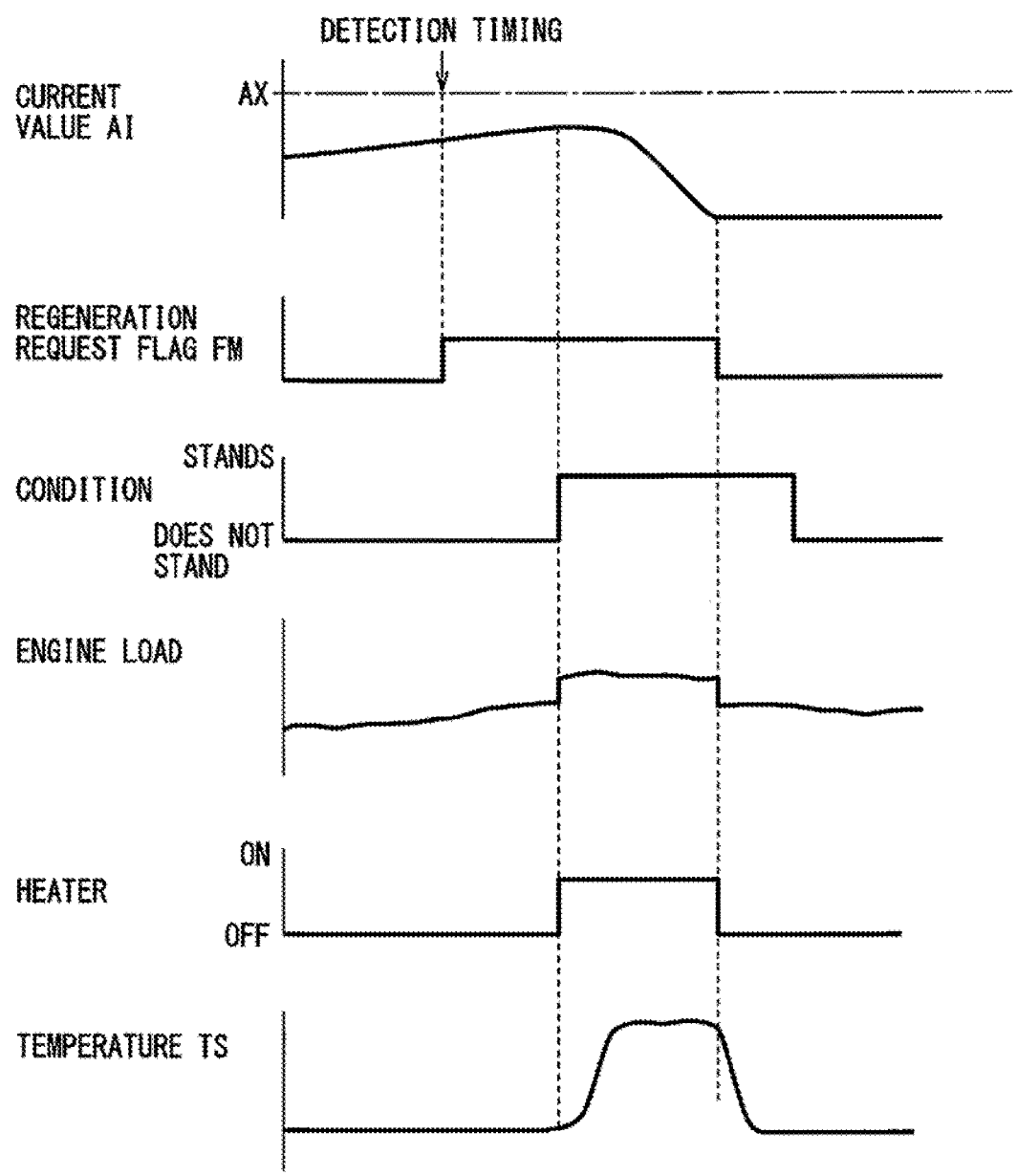
FIG. 20 is a timing diagram which shows the regeneration control of a particulate matter sensor, in accordance with some embodiments.

FIG. 20 shows a timing diagram for controlling a regeneration process for regenerating of the particulate matter sensor 68, in accordance with some embodiments. Referring to FIG. 20, FIG. 20 shows the change of the current value AI flowing across the pair of thin film electrodes 70, 71 of the particulate matter sensor 68, the change of the regeneration request flag FM of the particulate matter sensor 68, whether the condition enabling increase of engine load stands, that is, whether the vehicle can be automated driven along the lane selected by the lane selection unit 18, the change of the engine load, the operating state of the electric heater 72, and the change of temperature TS of the particulate matter sensor 68. Further, FIG. 20 shows the timing of a trouble detection of the particulate filter 63. This timing of a trouble detection of the particulate filter 63 is made right before the regeneration process of the particulate filter 63 is performed, right after the regeneration process of the particulate filter 63 is performed, or both right before and right after the regeneration process of the particulate filter 63 is performed.

As shown in FIG. 20, when the timing becomes one for a trouble detection of the particulate filter 63, if the current value AI flowing across the pair of thin film electrodes 70, 71 of the particulate matter sensor 68 does not exceed the preset reference value AX, the regeneration request flag FM of the particulate matter sensor 68 is set. If the regeneration request flag FM of the particulate matter sensor 68 is set, it is waited until the condition enabling increase of the engine load stands, that is, until the vehicle can be automated driven along the lane selected by the lane selection unit 18. If the condition enabling the increase of engine load stands, that is, if the vehicle starts to be automated driven along the lane selected by the lane selection unit 18, a regeneration command is issued and the engine load is made to increase. If the engine load is made to increase, the electric heater 72 is made to operate and the regeneration control unit 17 causes tire regeneration process of the particulate matter sensor 68 to be started.

If the regeneration process of the particulate matter sensor 68 is started, the temperature TS of the particulate matter sensor 68 gradually rises. At this time, the engine load is made to increase, and thus the exhaust gas temperature is high. Therefore, it is possible to make the temperature TS of the particulate matter sensor 68 rise by using a small amount of electric power. If the temperature TF of the particulate matter sensor 68 is made to rise, combustion of the particulate matter deposited on the surface of the detecting portion 69 of the particulate matter sensor 68 is started and the particulate matter deposited on the surface of the detecting portion 69 of the particulate matter sensor 68 is gradually removed. Next, if a fixed time elapses from when the electric heater 72 is actuated, the operation of the electric heater 72 is stopped and the regeneration control unit 17 causes the regeneration process of the particulate matter sensor 68 to end.

Figure 21:
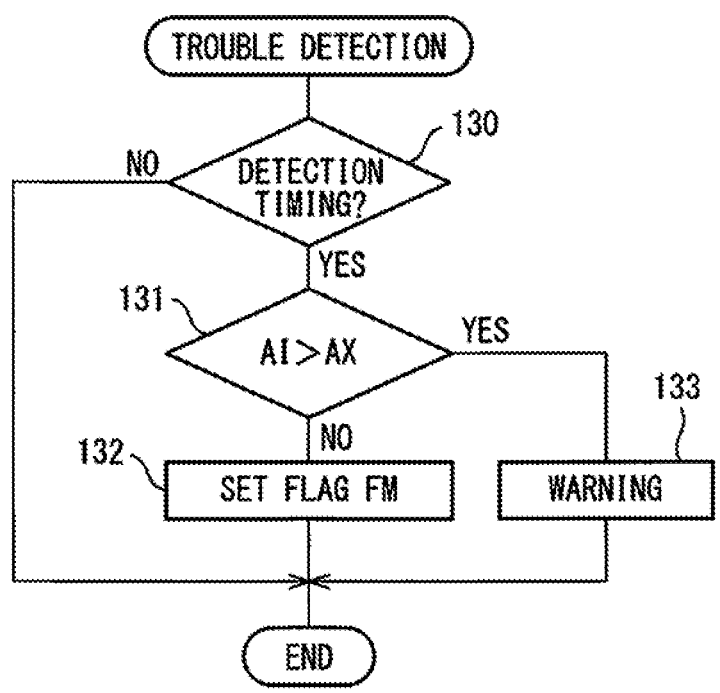
FIG. 21 is a flow chart for detecting a trouble of a particulate filter, in accordance with some embodiments.

FIG. 21 shows a routine for detecting a trouble of the particulate filter 63, in accordance with some embodiments. Note that, this routine is performed by interruption every fixed time period. Referring to FIG. 21, first, at step 130, it is judged if the timing is one for a trouble detection of the particulate filter 63. If not the timing for a trouble detection of the particulate filter 63, the processing cycle is ended. As opposed to this, when it is judged that the timing is one for a trouble detection of die particulate filter 63, the routine proceeds to step 131 where it is judged if the current value AI flowing across the pair of thin film electrodes 70, 71 exceeds a preset reference value AX. When the current value AI flowing across the pair of thin film electrodes 70, 71 does not exceed the preset reference value AX, the routine proceeds to step 132 where the regeneration request flag FM of the particulate matter sensor 68 is set. As opposed to this, when it is judged that the current value AI flowing across the pair of thin film electrodes 70, 71 exceeds the preset reference value AX, it is judged that the particulate filter 63 is faulty and the routine proceeds to step 133 where a warning is issued.

Figure 22:
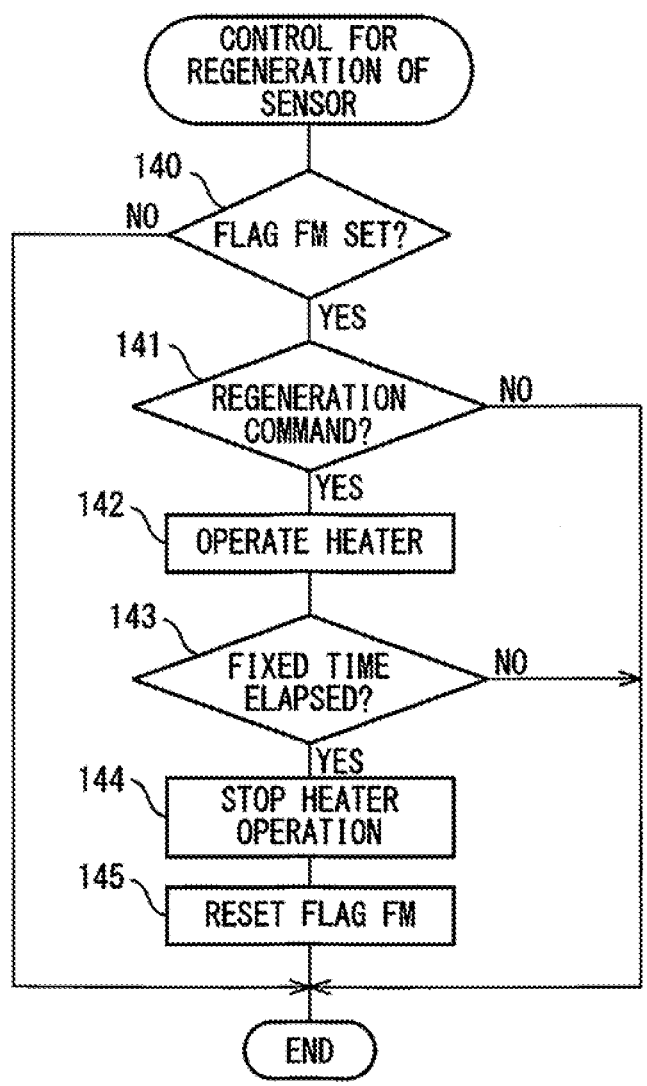
FIG. 22 is a flow chart for performing the regeneration control of a particulate matter sensor, in accordance with some embodiments.

FIG. 22 shows the routine for controlling a regeneration process of the particulate matter sensor 68, in accordance with some embodiments. Note that, this routine is also performed by interruption every fixed time period. Referring to FIG. 22, first, at step 140, it is judged if the regeneration request flag FM of the particulate matter sensor 68 is set.

When the regeneration request flag FM of the particulate matter sensor 68 is not set, the processing cycle is ended. As opposed to this, when the regeneration request flag FM of the particulate matter sensor 68 is set, the routine proceeds to step 141 where it is judged if a command for regeneration of the particulate matter sensor 68 has been issued. The command for regeneration of this particulate matter sensor 68 is issued when automated driving is started along the lane selected by the lane selection unit 18.

If the regeneration command of the particulate matter sensor 68 is issued, the routine proceeds to step 142 where the electric heater 72 is actuated. Next, at step 143, it is judged if a fixed time has elapsed from when the electric heater 72 was actuated. When it is judged that a fixed time has elapsed from when the electric heater 72 was actuated, the routine proceeds to step 144 where the operation of the electric heater 72 is stopped, then at step 145, the regeneration request flag FM of the particulate matter sensor 68 is reset. If the regeneration request flag FM of the particulate matter sensor 68 is reset, the control for increasing the engine load is stopped and the regeneration command is withdrawn. Next, normal automated driving without control for increase of the engine load is performed.

FIG. 23 to FIG. 25 show the routine for generation of a driving plan, in accordance with some embodiment. This routine for generation of a driving plan is performed repeatedly. Referring to FIG. 23, first, at step 200, the position of the host vehicle V is recognized by the vehicle position recognition unit 11 based on the positional information of the vehicle V received by the GPS reception unit 2. Next, at step 201, the outside state of the host vehicle V and the accurate position of the host vehicle V are recognized by the outside state recognition unit 12 from the results of detection of the external sensor 1. Next, at step 202, the driving state of the host vehicle V is recognized by the driving state recognition unit 13 from the results of detection of the internal sensor 3.

Next, at step 203, it is judged if the regeneration request flag FP of the particulate filter 63 is set. When the regeneration request flag FP of the particulate filter 63 is set, the routine proceeds to step 208, while when the regeneration request flag FP of the particulate filter 63 is not set, the routine proceeds to step 204. At step 204, it is judged if the regeneration request flag FS of the $NO_x$ storage reduction catalyst 62 is set. When the regeneration request flag FS of the $NO_x$ storage reduction catalyst 62 is set, the routine proceeds to step 208, while when the regeneration request flag FS of the $NO_x$ storage reduction catalyst 62 is not set, the routine proceeds to step 205. At step 205, it is judged if the regeneration request flag FM of the particulate matter sensor 68 is set. When the regeneration request flag FM of the particulate matter sensor 68 is set, the routine proceeds to step 208, while when the regeneration request flag FM of the particulate matter sensor 68 is not set, the routine proceeds to step 206.

That is, when all of the flags of the regeneration request flag FP of the particulate filter 63, the regeneration request flag FS of the $NO_x$ storage reduction catalyst 62, and the regeneration request flag FM of the particulate matter sensor 68 are not set, the routine proceeds to step 206. At step 206, a plurality of vehicle running paths showing changes along with time of the speed "v" and advancing direction "θ" of the host vehicle V are generated based on the information of surroundings of the vehicle which is detected by the external sensor 1 and the map information. Next, at step 207, a single vehicle running path enabling a destination to be reached safely in the shortest time while observing the law is determined from a plurality of these vehicle running paths. The host vehicle V is automated driven along this determined vehicle running path. That is, at this time, normal automated driving without control for increase of the engine load is performed.

On the other hand, when any flag of the regeneration request flag FP of the particulate filter 63, the regeneration request flag FS of the $NO_x$ storage reduction catalyst 62, or the regeneration request flag FM of the particulate matter sensor 68 is set, the routine proceeds to step 208. At this time, sometimes a command for regeneration of the particulate filter 63 has been issued or, sometimes is not issued when the regeneration request flag FP of the particulate filter 63 is set, sometimes a command for regeneration of the $NO_x$ storage reduction catalyst 62 has been issued or, sometimes is not issued when the regeneration request flag FS of the $NO_x$ storage reduction catalyst 62 is set, and sometimes a command for regeneration of the particulate matter sensor 68 has been issued or, sometimes is not issued when the regeneration request flag FM of the particulate matter sensor 68 is set, that is, sometimes a command for regeneration corresponding to the set regeneration request flag has been issued or, sometimes is not issued. At this time, when a command for regeneration corresponding to the set regeneration request flag has been issued, processing for regeneration corresponding to the set regeneration request flag has been performed. When a command for regeneration corresponding to the set regeneration request flag is not issued, processing for regeneration corresponding to the set regeneration request flag is not performed.

At step 208, processing for selecting a lane is performed. This processing for selecting a lane is shown in FIG. 24 and FIG. 25. Referring to FIG. 24 and FIG. 25, first, at step 211, it is judge if the road which the host vehicle V is currently being driven on has a plurality of two or more lanes, based on the information of surroundings of the vehicle detected by the external sensor 1 and the map information. When it is judged that the road which the host vehicle V is currently being driven on does not have two or more lanes, that is, when it is judged that the road which the host vehicle V is currently being driven on is a single lane, the routine proceeds to step 206 of FIG. 23. At this time, normal automated driving without control for increase of the engine load is performed. As opposed to this, a step 211, when it is judged that the road on which the vehicle V is currently being driven has a plurality of two or more lanes, the routine proceeds to step 212.

At step 212, the degree of congestion of the vehicles in each lane is detected based on the information of surroundings of the vehicle detected by the external sensor 1. Next, at step 213, it is judged if there is a lane with low degree of congestion of vehicles. In this case, as explained above, for example, when the number of other vehicles A present within 100 m before and after the position of the host vehicle V as the reference point is two or less, the degree of congestion of the vehicles is deemed low. At step 213, when it is judged that there is a lane with a low degree of congestion of the vehicle, the routine proceeds to step 214 where a lane with a low degree of congestion of vehicles among a plurality of lanes, that is, a lane predicted as increasing the engine load, is selected. Next, the routine proceeds to step 221 where a driving plan of the vehicle for changing the lane from the lane R2 to the lane R1, for example, as shown in FIG. 10B, is generated.

Figure 10B:
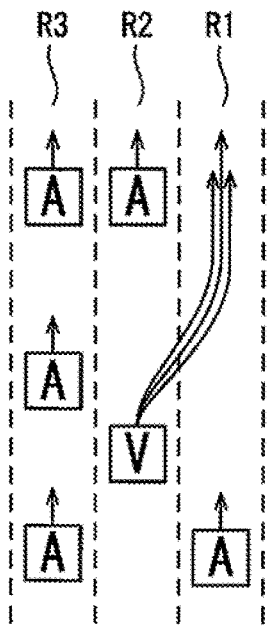
FIG. 10B is a view which schematically shows the running state of a vehicle, in accordance with some embodiments.

That is, at step 221, for example, as shown in FIG. 10B, a plurality of vehicle running paths showing changes along with time of the speed "v" and advancing direction "θ" of the vehicle V are generated based on the information of surroundings of the vehicle detected which by the external sensor 1 and the map information. Next, at step 222, from these plurality of vehicle running paths, one vehicle running path enabling a destination to be reached safely and in the shortest time while observing the law is determined. The host vehicle V is automated driven along thus determined vehicle running path.

On the other hand, when at step 213 it is judged that there is no lane with low degree of congestion of vehicles, the routine proceeds to step 215 where it is judged if there is an upward slope curve, that is, if there is an ascending grade road which extends on a curve, based on the information of surroundings of the vehicle which is detected by the external sensor 1 and the map information. When it is judged that there is an upward slope curve, the routine proceeds to step 216 where it is judged if the host vehicle V is running on the outside lane R2 as shown in FIG. 11. When it is judged that the host vehicle V is running on the outside lane R2, the routine proceeds to step 217 where the inside lane R1 is selected as the lane to be run on. Next, at step 221, a driving plan of the vehicle for changing the lane of the vehicle V from the outside lane R2 to the inside lane R1 as shown in FIG. 11 is generated.

On the other hand, when at step 215 it is judged that there is no upward slope curve, the routine proceeds to step 218. The routine proceeds to step 218 even if it is judged at step 216 that the host vehicle V is not running in the outside lane R2. At step 218, it is judged if the host vehicle V is running following another vehicle A running in front of it, based on the information of surroundings of the vehicle detected which by the external sensor 1. When it is judged that the host vehicle V is running following the other vehicle A running in front of it, at step 219, it is judged if there is a lane in which there is no vehicle in front, that is, if there is a lane in which the vehicle V can run without following the other vehicle A, based on the information of surroundings of the vehicle detected which by the external sensor 1.

When it is judged that there is a lane with no vehicle in front, that is, when it is judged that there is a lane in which the vehicle V can run without following the other vehicle A, the routine proceeds to step 220 where the lane with no vehicle in front, that is, the lane in which the vehicle V can run without following the other vehicle A, is selected. At this time, at step 221, a driving plan of the vehicle for making the vehicle host V change the lane from the lane R2 to the lane R1 in which the host vehicle V can run without following the other vehicle A, for example, as shown in FIG. 12, is generated. On the other hand, when it is judged at step 218 that the vehicle V is not running following the other vehicle A running in front of it, and when it is judged at step 219 that there is no lane with no vehicle in front, that is, when it is judged that there is no lane in which the host vehicle V can run without following the other vehicle A, the routine proceeds to step 206 of FIG. 23 where normal automated driving where the engine load is not increased is performed.

When at step 222 the driving plan of the vehicle for increasing the engine load is determined and the host vehicle V is automated driven along the determined vehicle running path, the routine proceeds to step 209 of FIG. 23 where it is judged if a regeneration command has been issued. When a regeneration command has not been issued, the routine proceeds to step 220 where the regeneration command is issued.

That is, as shown in FIG. 15, after the regeneration request flag FP of the particulate filter 63 is set and before the condition enabling increase of the engine load stands, if the differential pressure $\Delta P$ before and after the particulate filter 63 detected by the differential pressure sensor 67 exceeds the preset second reference value PY or, as shown in FIG. 18, after the regeneration request flag FS of the $NO_x$ storage reduction catalyst 62 is set and before the condition enabling increase of the engine load stands, if the $SO_x$ amount $\Sigma SOX$ stored in the $NO_x$ storage reduction, catalyst 62 exceeds the preset second reference value SY, a regeneration request is issued and the regeneration control unit 17 causes the regeneration process of the particulate filter 63 or the regeneration process of the $NO_x$ storage reduction catalyst 62 to be started. When the regeneration process of the particulate filter 63 or the regeneration process of the $NO_x$ storage reduction catalyst 62 is started in this way, and when these regeneration processes are being performed, if at step 208, for example, it is judged that there is a lane of vehicles increasing the engine load, the lane of the vehicle increasing the engine load is selected and the vehicle is automated driven along the selected lane, On the other hand, when waiting until the condition enabling increase of the engine load stands even if the regeneration request flag FP of the particulate filter 63 is set as shown in FIG. 14, when waiting until the condition enabling increase of the engine load stands even if the regeneration request flag FS of the $NO_x$ storage reduction catalyst 62 is set as shown in FIG. 17, and, when waiting until the condition enabling increase of the engine load stands even if the regeneration request flag FM of the particulate matter sensor 68 is set as shown in FIG. 20, it is judged that the condition enabling increase of the engine load stands when the driving plan of the vehicle increasing the engine load is determined at step 222 of FIG. 25. Therefore, in this case, the routine proceeds from step 209 to step 210 where a regeneration command is issued. After that, when at step 208, for example, it is judged that there is a lane of the vehicle increasing the engine load, the lane increasing the engine load is selected and the vehicle is automated driven along the selected lane.

An aspect of this description is related to a control system. The control system comprises a sensor configured to detect information associated with an area surrounding a vehicle. The control system also comprises an electronic control unit configured to control an automated driving of the vehicle based on the detected information and map information. The electronic control unit comprises a driving plan generation unit configured to generate a vehicle driving plan following a preset target route based on the detected in formation and fee map information. The driving plan generation unit is also configured to generate a target running path based on the detected information and the map information. The electronic control unit also comprises a driving control unit configured to control an engine to cause the vehicle to run along the target running path. The electronic control unit further comprises a regeneration control unit configured to control a regeneration process for regenerating an engine exhaust gas treatment apparatus by removing particulate matter or sulfur oxides build-up from the exhaust gas treatment apparatus. The electronic control unit additionally comprises a lane selection unit configured to predict an engine load associated with traveling in each lane of a plurality of lanes based on the detected information and the map information. The lane selection unit is also configured to select a lane of the plurality of lanes as being a lane which would cause an increase in engine load when the regeneration process is performed. The control system is configured to cause the vehicle to be driven in the lane selected by the lane selection unit when the regeneration process is performed.

Another aspect of this description relates to a method, comprising detecting information associated with an area surrounding a vehicle by a sensor. The method also comprises controlling an automated driving of the vehicle based on the detected information and map information by an electronic control unit. The method further comprises generating a vehicle driving plan following a preset target route based on the detected information and the map information. The method additionally comprises generating a target running path based on the detected information and the map information. The method also comprises controlling an engine to cause the vehicle to run along the target running path. The method further comprises regenerating an engine exhaust gas treatment apparatus by removing particulate matter or sulfur oxides built up at the exhaust gas treatment apparatus. The method additionally comprises predicting an engine load associated with traveling in each lane of a plurality of lanes based on the detected information and the map information. The method also comprises selecting a lane of the plurality of lanes as being a lane which would cause an increase in engine load when the exhaust gas treatment apparatus is being regenerated. The method further comprises causing the vehicle to be driven in the lane selected by the lane selection unit when the exhaust gas treatment apparatus is being regenerated.

A further aspect of this description relates to a control system. The control system comprises a sensor configured to detect information associated with an area surrounding a vehicle. The control system also comprises an electronic control unit configured to control an automated driving of the vehicle based on the detected information and map information. The electronic control unit comprises a driving control unit configured to control an engine of the vehicle. The electronic control unit also comprises a regeneration control unit configured to control a process for removing particulate matter from an engine exhaust gas treatment apparatus. The electronic control unit further comprises a lane selection unit configured to predict an engine load associated with traveling in each lane of a plurality of lanes based on the detected, information and the map information, and to select a lane of the plurality of lanes as being a lane which would cause an increase in engine load when the process for removing the particulate matter is performed. The driving control unit is configured to cause the vehicle to be driven in the lane selected by the lane selection unit during the process for removing the particulate matter.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A control system, comprising:
 a sensor configured to detect information associated with an area surrounding a vehicle; and
 an electronic control unit configured to control an automated driving of the vehicle based on the detected information and map information, said electronic control unit comprising:
   a driving plan generation unit configured to generate a vehicle driving plan following a preset target route based on the detected information and the map information, and to generate a target running path based on the detected information and the map information;
   a driving control unit configured to control an engine to cause the vehicle to run along the target running path;
   a regeneration control unit configured to control a regeneration process for regenerating an engine exhaust gas treatment apparatus by removing particulate matter or sulfur oxide build-up from the exhaust gas treatment apparatus; and
   a lane selection unit configured to predict an engine load associated with traveling in each lane of a plurality of lanes based on the detected information and the map information, and to select a lane of the plurality of lanes as being a lane which would cause an increase in engine load when the regeneration process is performed,
wherein, the control system is configured to cause the vehicle to be driven in the lane selected by the lane selection unit when the regeneration process is performed.

2. The control system according to claim 1, wherein said exhaust gas treatment apparatus comprises a particulate filter configured to trap particulate matter contained in an exhaust gas, the regeneration control unit is configured to cause fuel to be fed to the particulate filter when the regeneration process is performed, and the regeneration process causes particulate matter build-up to be removed from the particulate filter.

3. The control system according to claim 1, wherein said exhaust gas treatment apparatus comprises an $NO_x$ storage reduction catalyst configured to remove $NO_x$ contained in an exhaust gas, the regeneration control unit is configured to cause fuel to be fed to the $NO_x$ storage reduction catalyst when the regeneration process is performed, and the regeneration process causes sulfur oxides to be released from the $NO_x$ storage reduction catalyst.

4. The control system according to claim 1, wherein the control system comprises a particulate matter sensor configured to detect an amount of particulate matter in an exhaust gas, and the regeneration control unit is configured to cause a temperature of the particulate matter sensor to be raised such that at least some of the particulate matter build-up is removed from the particulate matter sensor when the vehicle is driven in the lane selected by the lane selection unit.

5. The control system according to claim 1, wherein the lane selection unit is configured to determine that a road the vehicle is being run on is a road exclusively for motor vehicles based on the detected information and the map information, and the lane selection unit is configured to select a passing lane or a driving lane close to the passing lane among the plurality of driving lanes as the lane which would cause the increase hi engine load when the regeneration process is performed based on the determination that the road the vehicle is being run on is exclusively for motor vehicles.

6. The control system according to claim 1, wherein the lane selection unit is configured to select the lane which would cause the increase in engine load based on a determination that the selected lane would cause a maximum increase in engine load when the regeneration process is performed compared to the other lanes of the plurality of lanes.

7. The control system according to claim 1, wherein the lane selection unit is configured to detect a degree of congestion of vehicles for the plurality of lanes based on the detected information, and the lane selection unit is configured to select a lane with a low degree of congestion of vehicles among the plurality of lanes as the lane which would cause the increase in engine load when the regeneration process is performed.

8. The control system according to claim 7, wherein the degree of congestion of vehicles is based on a quantity of vehicles running within a fixed distance in each lane of the plurality of lanes.

9. The control system according to claim 1, wherein the lane selection unit is configured to predict that there is an upward slope in the lanes of the plurality of lanes based on the detected information and the map information, and the lane selection unit is configured to select a lane with a sharpest upward slope among the plurality of lanes as the lane which would cause the increase in engine load when the regeneration process is performed.

10. The control system according to claim 9, wherein when the upward slope is a curved road, the lane selection unit is configured to select an inside lane of the plurality of lanes as the lane which would cause the increase in engine load when the regeneration process is performed.

11. The control system according to claim 1, wherein the lane selection unit is configured to determine the vehicle is running following another vehicle based on the detected information, and the lane selection unit is configured to select a lane for running the vehicle without following the other vehicle as the lane which would cause the increase in engine load when the process is performed.

12. The control system according to claim 1, wherein regeneration control unit is configured to cause the process for regenerating the exhaust gas treatment apparatus to occur based on a received regeneration command or to wait until a condition predicted to cause an increase in engine load occurs to cause the process for regenerating the exhaust gas treatment apparatus.

13. A method, comprising:
  detecting information associated with an area surrounding a vehicle by a sensor; and
  controlling an automated driving of the vehicle based on the detected information and map information by an electronic control unit;
  generating a vehicle driving plan following a preset target route based on the detected information and the map information;
  generating a target running path based on the detected information and the map information;
  controlling an engine to cause the vehicle to run along the target running path;
  causing an engine exhaust gas treatment apparatus to be regenerated by removing particulate matter or sulfur oxides built up at the exhaust gas treatment apparatus;
  predicting an engine load associated with traveling in each lane of a plurality of lanes based on the detected information and the map information;
  selecting a lane of the plurality of lanes as being a lane which would cause an increase in engine load when the exhaust gas treatment apparatus is being regenerated; and
  causing the vehicle to be driven in the lane selected by the lane selection unit when the exhaust gas treatment apparatus is being regenerated.

14. The method according to claim 13, further comprising:
  determining that a road the vehicle is being run on is a road exclusively for motor vehicles based on the detected information and the map information; and
  selecting a passing lane or a driving lane next to the passing lane among the plurality of driving lanes as the lane which would cause the increase in engine load when the exhaust gas treatment apparatus is being regenerated.

15. The method according to claim 14, wherein the selected lane based on a determination that the selected lane would cause a maximum increase in engine load when the regeneration process is performed compared to the other lanes of the plurality of lanes.

16. The method according to claim 13, further comprising:
  detecting a degree of congestion of vehicles for the plurality of lanes based on the detected information; and
  selecting a lane with a low degree of congestion of vehicles among the plurality of lanes as the lane which would cause the increase in engine load when the exhaust gas treatment apparatus is being regenerated.

17. The method according to claim 13, further comprising:
  predicting that there is an upward slope in the lanes of the plurality of lanes based on the detected information and the map information; and
  selecting a lane with a sharpest upward slope among the plurality of lanes as the lane which would cause the increase in engine load when the exhaust gas treatment apparatus is being regenerated.

18. The method according to claim 17, wherein when the upward slope is a curved road, the method further comprises:
  selecting an inside lane of the plurality of lanes as the lane which would cause the increase in engine load when the exhaust gas treatment apparatus is being regenerated.

19. The method according to claim 13, further comprising:
  detecting another vehicle in front of the vehicle being controlled by automated driving; and
  selecting a lane for running the vehicle without following the other vehicle as the lane which would cause the increase in engine load when the exhaust gas treatment apparatus is being regenerated.

20. A control system, comprising:
  a sensor configured to detect information associated with an area surrounding a vehicle; and
  an electronic control unit configured to control an automated driving of the vehicle based on the detected information and map information, said electronic control unit comprising:
    a driving control unit configured to control an engine of the vehicle;
    a regeneration control unit configured to control a process for removing particulate matter from an engine exhaust gas treatment apparatus; and
    a lane selection unit configured to predict an engine load associated with traveling in each lane of a plurality of lanes based on the detected information and the map information, and to select a lane of the plurality of lanes as being a lane which would cause an increase in engine load when the process for removing the particulate matter is performed,
wherein the driving control unit is configured to cause the vehicle to be driven in the lane selected by the lane selection unit during the process for removing the particulate matter.

* * * * *